US012633249B2

(12) United States Patent
Hong et al.

(10) Patent No.: US 12,633,249 B2
(45) Date of Patent: May 19, 2026

(54) DISPLAY DEVICE FOR COMPENSATING FOR CHANGE IN CHARACTERISTIC OF PIXELS BY HORIZONTAL LINE UNIT

(71) Applicant: Samsung Display Co., LTD., Yongin-si (KR)

(72) Inventors: Seokha Hong, Yongin-si (KR); Hyungjin Kim, Yongin-si (KR); Jong-Woong Park, Yongin-si (KR); Kanghee Lee, Yongin-si (KR); Kyungsu Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/650,399

(22) Filed: Apr. 30, 2024

(65) Prior Publication Data

US 2025/0124851 A1 Apr. 17, 2025

(30) Foreign Application Priority Data

Oct. 16, 2023 (KR) ........................ 10-2023-0137656

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/04* (2013.01); *G09G 2310/08* (2013.01); *G09G 2320/045* (2013.01);
(Continued)

(58) Field of Classification Search
CPC .............. G09G 3/30–3291; G09G 2300/0842; G09G 2310/0213; G09G 2310/04; G09G 2310/08; G09G 2320/0233; G09G 2320/0242; G09G 2320/04;
(Continued)

(56) References Cited

U.S. PATENT DOCUMENTS 10,701,199 B2 6/2020 Colston
10,943,531 B1 * 3/2021 Chen .................... G09G 3/3208
11,043,191 B1 * 6/2021 Kang ........................ G09G 5/10
(Continued)

FOREIGN PATENT DOCUMENTS

CN 116229859 A 6/2023
KR 100433020 B1 5/2004
(Continued)

*Primary Examiner* — Keith L Crawley
(74) *Attorney, Agent, or Firm* — CANTOR COLBURN LLP

(57) ABSTRACT

A display device includes: a display panel, and a driving controller to receive an image signal and a control signal, drive the first display region of the display panel at a first driving frequency, and drive the second display region at a second driving frequency. The driving controller counts a first stress time of each of the first horizontal lines, and calculates a first operating time of each of the first horizontal lines based on the first stress time and the first driving frequency, counts a second stress time of each of the second horizontal lines and calculates a second operating time of each of the second horizontal lines based on the second stress time and the second driving frequency, and outputs an image data signal obtained by compensating for stress for the image signal based on the image signal, the first operating time, and the second operating time.

20 Claims, 17 Drawing Sheets

(52) U.S. Cl.
CPC ................. *G09G 2320/048* (2013.01); *G09G 2330/021* (2013.01); *G09G 2340/0435* (2013.01)

(58) Field of Classification Search
CPC ............................ G09G 2320/043–048; G09G 2320/0686–106; G09G 2330/021; G09G 2340/0435
See application file for complete search history.

(56) References Cited

U.S. PATENT DOCUMENTS

| | | | | |
|---|---|---|---|---|
| 11,798,463 B2 | 10/2023 | Kim et al. | | |
| 2001/0052887 A1 | 12/2001 | Tsutsui et al. | | |
| 2003/0201727 A1* | 10/2003 | Yamazaki | G09G 3/3291 | 315/169.1 |
| 2006/0092108 A1* | 5/2006 | Ozaki | G09G 3/3208 | 345/76 |
| 2012/0256971 A1* | 10/2012 | Shin | G09G 3/3233 | 345/77 |
| 2014/0232409 A1* | 8/2014 | Keum | G09G 3/3233 | 324/414 |
| 2021/0201819 A1* | 7/2021 | Choi | G09G 3/3275 | |
| 2022/0028319 A1* | 1/2022 | Kim | G09G 3/3233 | |
| 2022/0036823 A1* | 2/2022 | Iwauchi | G09G 3/32 | |
| 2022/0044619 A1* | 2/2022 | Sohn | G09G 3/20 | |
| 2022/0068195 A1* | 3/2022 | Yun | G09G 3/32 | |
| 2022/0223092 A1* | 7/2022 | Lee | G09G 3/2007 | |
| 2023/0178003 A1* | 6/2023 | Kim | G09G 3/3233 | |
| 2023/0186827 A1* | 6/2023 | Jo | G09G 3/006 | 345/60 |

FOREIGN PATENT DOCUMENTS

| | | |
|---|---|---|
| KR | 102458468 B1 | 10/2022 |
| KR | 1020230084400 A | 6/2023 |

* cited by examiner

DISPLAY DEVICE FOR COMPENSATING FOR CHANGE IN CHARACTERISTIC OF PIXELS BY HORIZONTAL LINE UNIT

DISPLAY DEVICE

This application claims priority to Korean Patent Application No. 10-2023-0137656, filed on Oct. 16, 2023, and all the benefits accruing therefrom under 35 U.S.C. § 119, the content of which in its entirety is herein incorporated by reference.

BACKGROUND

Embodiments of the present disclosure described herein relate to a display device.

A display device includes pixels connected to data lines and scan lines. Each of the pixels includes an emission element and a pixel circuit to control the emission element. The pixel circuit may provide a current corresponding to a data signal to the emission element. In this case, light having specific brightness may be generated to correspond to a current flowing through the emission element.

The characteristic of each pixel may be changed depending on the operating environment.

SUMMARY

Embodiments of the present disclosure provide a display device capable of reducing power consumption.

Embodiments of the present disclosure provide a display device capable of compensating for the change in the characteristic of pixels.

According to an embodiment, a display device includes: a display panel including a first display region and a second display region, and a driving controller to receive an image signal and a control signal, output an image data signal to be provided to the display panel, drive the first display region of the display panel at a first driving frequency, and drive the second display region at a second driving frequency different from the first driving frequency, the display panel includes first horizontal lines corresponding to the first display region and second horizontal lines corresponding to the second display region, and the driving controller is to count a first stress time of each of the first horizontal lines, and calculate a first operating time of each of the first horizontal lines based on the first stress time and the first driving frequency, count a second stress time of each of the second horizontal lines and calculate a second operating time of each of the second horizontal lines based on the second stress time and the second driving frequency, and output the image data signal obtained by compensating for stress for the image signal based on the image signal, the first operating time, and the second operating time.

According to an embodiment, the driving controller may output the image data signal obtained by compensating for the stress for the image signal corresponding to the first horizontal lines based on the image signal and the first operating time of each of the first horizontal lines.

According to an embodiment, the driving controller may output the image data signal obtained by compensating for the stress for the image signal corresponding to the second horizontal lines based on the image signal and the second operating time of each of the second horizontal lines.

According to an embodiment, the driving controller may include a stress time calculating unit to count the first stress time of each of the first horizontal lines, and count the second stress time of each of the second horizontal lines, a memory to store previous stress data of a previous frame, and a compensating unit to calculate stress data of a present frame based on the image signal, the previous stress data, the first operating time, and the second operating time, and output the image data signal corresponding to the image signal based on the stress data, and the stress data from the compensating unit may be stored in the memory, as the previous stress data for a next frame.

According to an embodiment, the stress time calculating unit may include first counters corresponding to the first horizontal lines and for outputting the first stress time, second counters corresponding to the first horizontal lines and for outputting the second stress time, and a counter controller to control the first counters and the second counters, in response to the control signal.

According to an embodiment, the control signal may include a start signal indicating starting of each of frames, and the stress time calculating unit may control the first counters and the second counters, in response to the start signal.

According to an embodiment, the frames may include a full driving frame for driving the first horizontal lines and the second horizontal lines, and a masking enable frame for driving only the first horizontal lines of the first and second horizontal lines.

According to an embodiment, the counter controller may control the first counters to count up during the full driving frame and the masking enable frame, and to control the second counters to count up during the masking enable frame.

According to an embodiment, each of the first counters may be reset when a corresponding horizontal line is driven among the first horizontal lines, and each of the second counters may be reset when a corresponding horizontal line is driven among the second horizontal lines.

According to an embodiment, a display device includes: a display panel including a first display region and a second display region, and a driving controller to receive an image signal and a control signal, output an image data signal to be provided to the display panel, drive the first display region of the display panel at a first driving frequency in a multi-frequency mode, and drive the second display region at a second driving frequency different from the first driving frequency, in a multi-frequency mode, the display panel includes first horizontal lines corresponding to the first display region and second horizontal lines corresponding to the second display region, and the driving controller may, in the multi-frequency mode, count a first stress time of each of the first horizontal lines and calculate a first operating time of each of the first horizontal lines based on the first stress time and the first driving frequency, count a second stress time of each of the second horizontal lines and calculate a second operating time of each of the second horizontal lines based on the second stress time and the second driving frequency, and output the image data signal obtained by compensating for a stress for the image signal based on the image signal, the first operating time, and the second operating time.

According to an embodiment, the driving controller may, in the multi-frequency mode, compensate for the stress for the image signal corresponding to the first horizontal lines based on the image signal and the first operating time of each of the first horizontal lines, and output the image data signal obtained by compensating for the stress for the image signal corresponding to the second horizontal lines based on the image signal and the second operating time of each of the second horizontal lines.

According to an embodiment, the driving controller may, in a single-frequency mode, count a third stress time of each of the first horizontal lines and the second horizontal lines and calculate a third operating time of each of the first horizontal lines and the second horizontal lines based on the third stress time and the first driving frequency, and output the image data signal obtained by compensating for the stress for the image signal based on the image signal and the third operating time.

According to an embodiment, the driving controller may include a stress time calculating unit to count the first stress time of each of the first horizontal lines, and count the second stress time of each of the second horizontal lines, a memory to store previous stress data of a previous frame, and a compensating unit to calculate stress data of a present frame based on the image signal, the previous stress data, the first operating time, and the second operating time, and output the image data signal corresponding to the image signal based on the stress data, and the stress data from the compensating unit may be stored in the memory, as the previous stress data for a next frame.

According to an embodiment, the stress time calculating unit may include first counters corresponding to the first horizontal lines and for outputting the first stress time, second counters corresponding to the first horizontal lines and for outputting the second stress time, and a counter controller to control the first counters and the second counters, in response to the control signal.

According to an embodiment, the control signal may include a start signal indicating starting of each of frames, and the stress time calculating unit may control the first counters and the second counters, in response to the start signal.

According to an embodiment, the frames may include a full driving frame for driving the first horizontal lines and the second horizontal lines, and a masking enable frame for driving only the first horizontal lines of the first and second horizontal lines, and the counter controller may control the first counters to count up during the full driving frame and the masking enable frame, and to control the second counters to count up during the masking enable frame.

According to an embodiment, a display device includes: a display panel including a first display region and a second display region, and a driving controller to receive an image signal and a control signal, output an image data signal to be provided to the display panel, drive the first display region of the display panel at a first driving frequency, and drive the second display region at a second driving frequency different from the first driving frequency, the display panel includes first horizontal lines corresponding to the first display region and second horizontal lines corresponding to the second display region, the driving controller includes a stress time calculating unit to count a first stress time of each of the first horizontal lines, and count a second stress time of each of the second horizontal lines, a memory to store previous stress data of a previous frame, and a compensating unit to calculate stress data of a present frame based on the image signal, the previous stress data, the first operating time, and the second operating time, and output the image data signal corresponding to the image signal based on the stress data, and the stress data from the compensating unit is stored in the memory, as the previous stress data for a next frame.

According to an embodiment, the stress time calculating unit may include first counters corresponding to the first horizontal lines and for outputting the first stress time, second counters corresponding to the first horizontal lines and for outputting the second stress time, and a counter controller to control the first counters and the second counters, in response to the control signal.

According to an embodiment, the control signal may include a start signal indicating starting of each of frames, and the stress time calculating unit may control the first counters and the second counters, in response to the start signal.

According to an embodiment, the frames may include a full driving frame for driving the first horizontal lines and the second horizontal lines, and a masking enable frame for driving only the first horizontal lines of the first and second horizontal lines, and the counter controller may control the first counters to count up during the full driving frame and the masking enable frame, and to control the second counters to count up during the masking enable frame.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
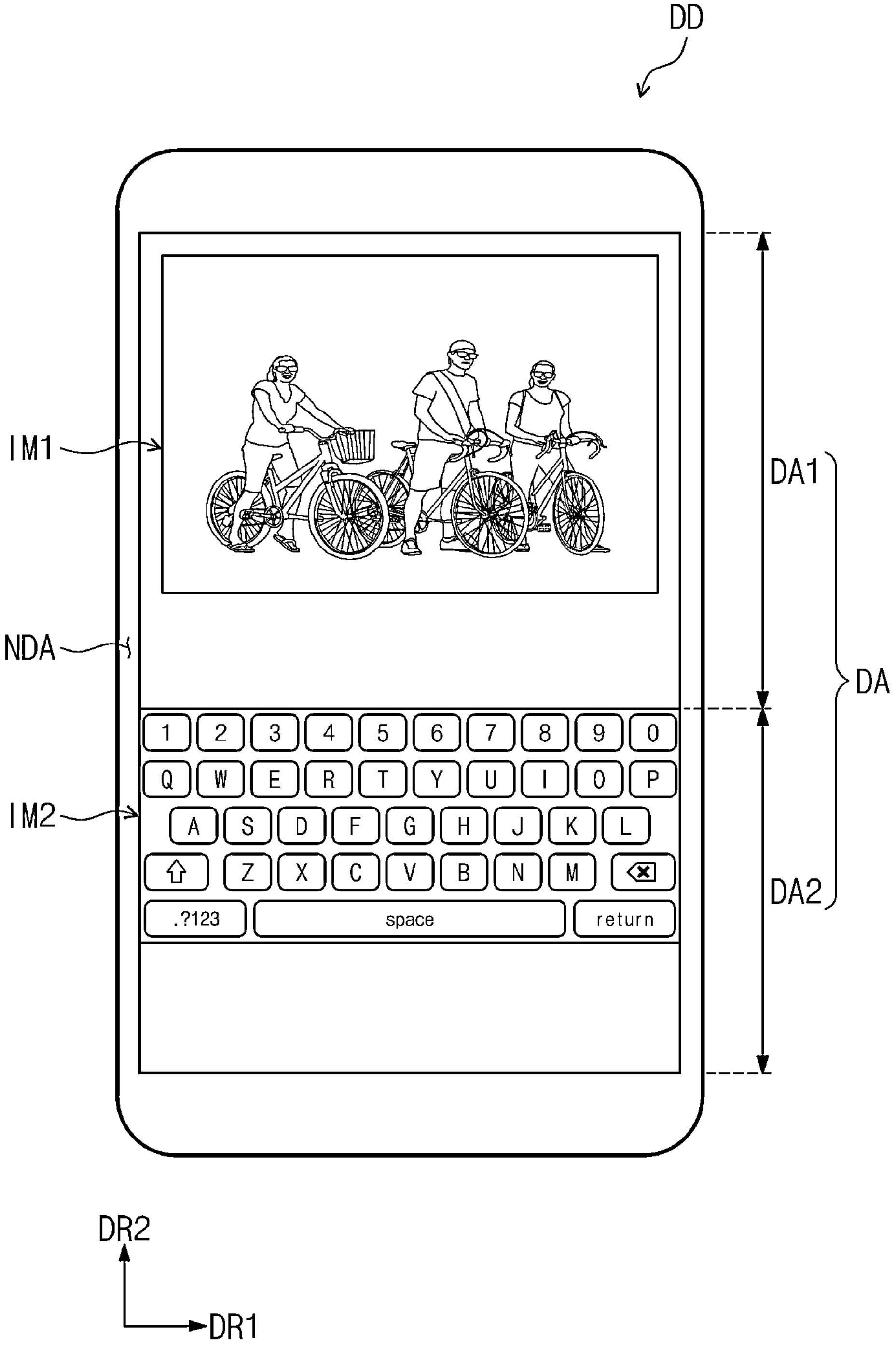
FIG. 1 illustrates a display device according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively. The term "and/or" includes any and all combinations of one or more of associated components.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a view illustrating a display device according to an embodiment of the present disclosure.

Referring to FIG. 1, according to an embodiment of the present disclosure, a portable terminal is illustrated as an example of a display device DD. The portable terminal may include a tablet PC, a smartphone, a personal digital assistant ("PDA"), a portable multimedia player ("PMP"), a game console, and a wristwatch-type electronic device. However, the present disclosure is not limited thereto. The present disclosure may be used for small and medium-size electronic devices, such as a personal computer, a notebook computer, a kiosk, a car navigation unit, and a camera, in addition to large-size electronic equipment, such as a television or an outside billboard. The above examples are provided only as an embodiment, and it is obvious that the display device DD may be applied to any other electronic device(s) without departing from the concept of the present disclosure.

As illustrated in FIG. 1, a display surface for displaying a first image IM1 and a second image IM2 is parallel to a plane defined by a first direction DR1 and a second direction DR2. The display device DD includes a plurality of regions divided on the display surface. The display surface includes a display region DA on which the first image IM1 and the second image IM2 are displayed, and a non-display region NDA adjacent to the display region DA. The non-display region NDA may be named a bezel region. For example, the display region DA may have a rectangular shape. The non-display region NDA surrounds the display region DA. In addition, although not illustrated, the display device DD may include a shape partially curved.

The display region DA of the display device DD includes a first display region DA1 and a second display region DA2. In a specific application program, the first image IM1 may be displayed in the first display region DA1, and the second image IM2 may be displayed on the second display region DA2. For example, the first image IM1 may be an image (for example, a video) having a shorter variation cycle, and the second image IM2 may be an image having a longer variation cycle (for example, a still image, such as a picture or text information).

Figure 4A:
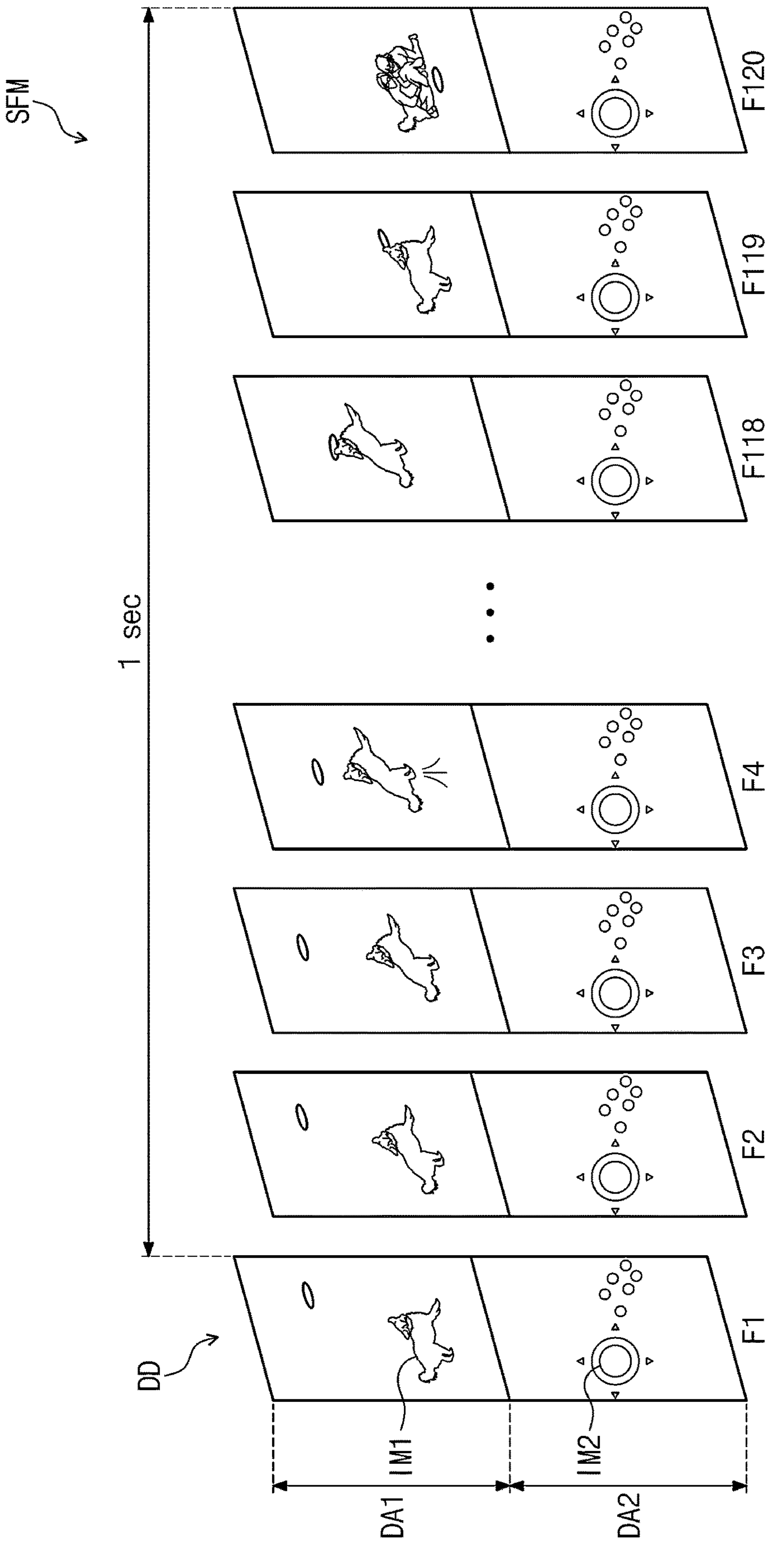
FIG. 4A is a view illustrating the operation of a display device in a single-frequency mode.
Figure 4B:
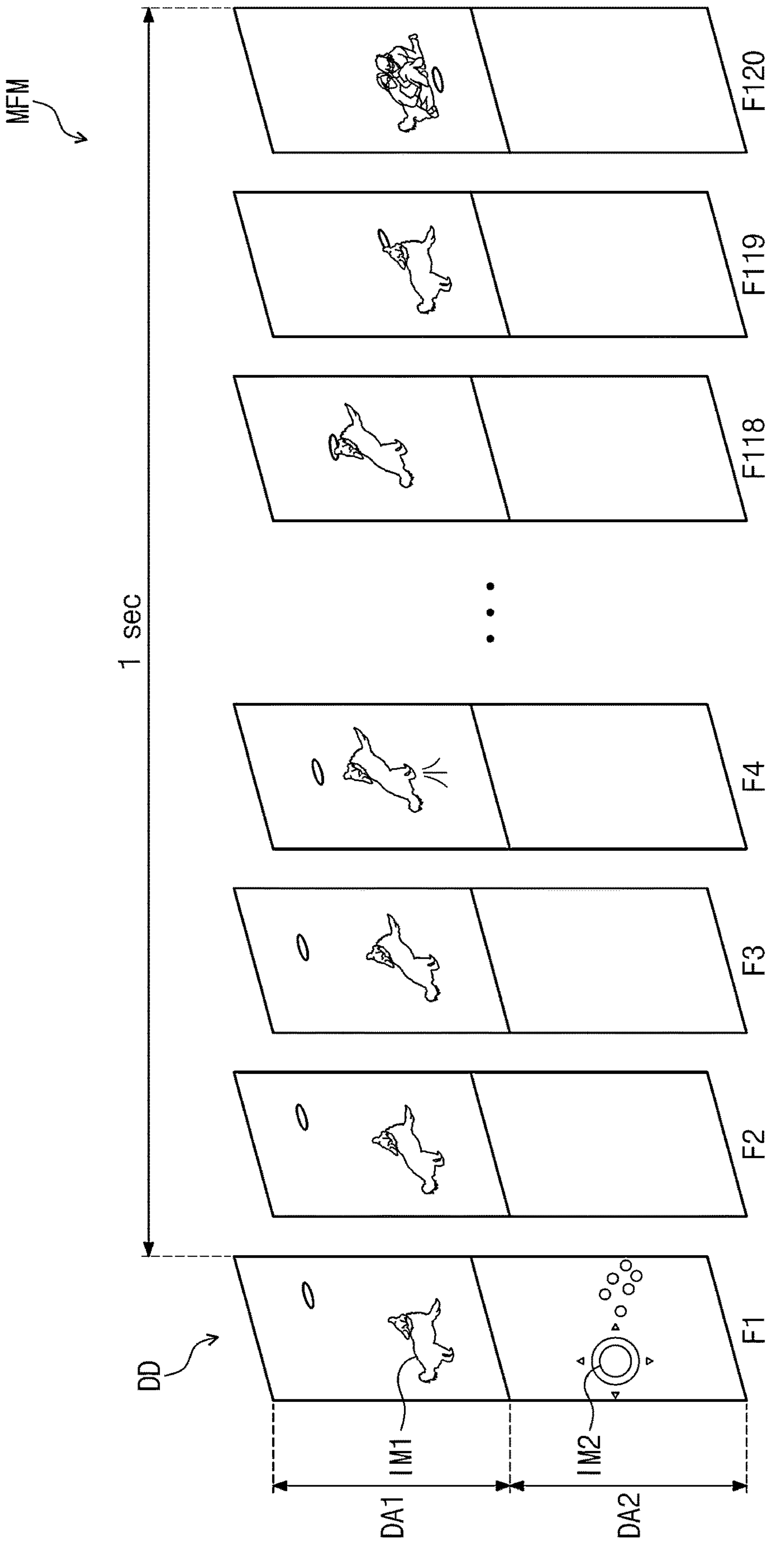
FIG. 4B is a view illustrating the operation of a display device in a multi-frequency mode.

The operating mode of the display device DD may include a single-frequency mode SFM (See FIG. 4A) and a multi-frequency mode MFM (See FIG. 4B). The display device DD may drive the first display region DA1 and the second display region DA2 at a basic frequency, in the single-frequency mode SFM. According to an embodiment, the display device DD may drive the first display region DA1 for displaying the first image IM1, at a first driving frequency in the multi-frequency mode MFM, and drive the second display region DA2 for displaying the second image IM2 at a second driving frequency. According to an embodiment, the first driving frequency may be higher or equal to the basic frequency. According to an embodiment, the second driving frequency may be lower than the first driving frequency. The display device DD may reduce the power consumption by reducing the driving frequency of the second display region DA2.

The size of each of the first display region DA1 and the second display region DA2 may be a preset size, and may be changed by an application program.

According to an embodiment, when the still image is displayed on the first display region DA1 and the video is displayed on the second display region DA2, the first display region DA1 may be driven at the second driving frequency lower than the basic frequency, and the second display region DA2 may be driven at the first driving frequency higher than or equal to the basic frequency.

In addition, the display region DA may be divided into three or more display regions. A driving frequency of each of the display regions may be determined depending on the type (a still image or video) of an image displayed in each of the display regions.

Figure 2:
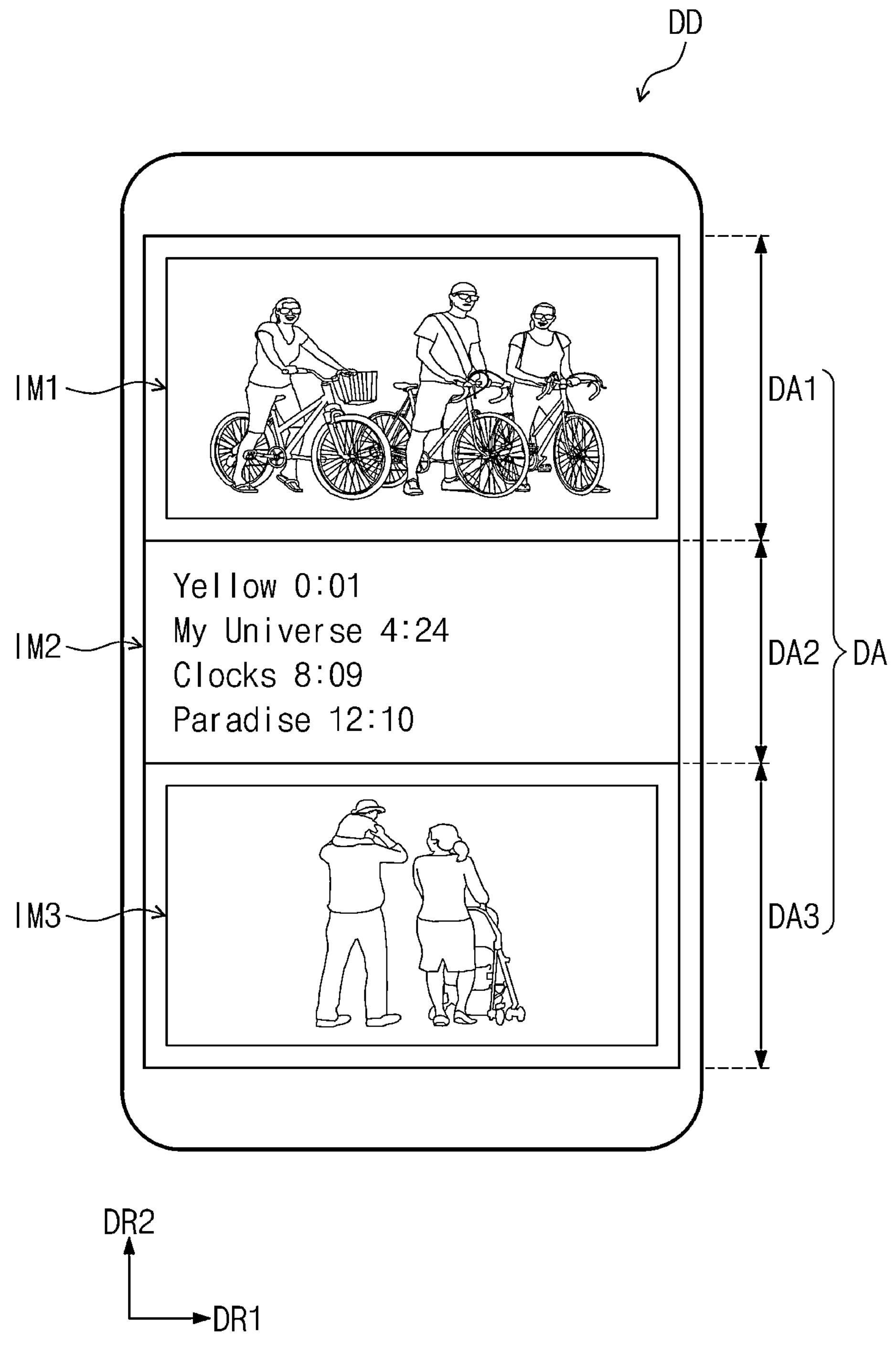
FIG. 2 illustrates an image displayed on a display device according to an embodiment of the present disclosure.

FIG. 2 is a view illustrating an image displayed on the display device DD according to an embodiment of the present disclosure.

Referring to FIG. 2, the display region DA of the display device DD includes the first display region DA1, the second display region DA2, and a third display region DA3. In a specific application program, the first image IM1 may be displayed on the first display region DA1, the second image IM2 may be displayed on the second display region DA2, and a third image IM3 may be displayed on the third display region DA3. According to an embodiment, for example, the first image IM1 and the third image IM3 may be images having a shorter variation cycle (for example, a video), and the second image IM2 may be an image (for example, a still image or text information such as a picture) having a longer variation cycle.

The display device DD may drive the first display region DA1, the second display region DA2, and the third display region DA3 at the basic frequency, in the single-frequency mode SFM. According to an embodiment, the display device DD may drive the first display region DA1 for displaying the first image IM1 and the third display region DA3 for displaying the third image IM3, at the first driving frequency and drive the second display region DA2 for displaying the second image IM2 at the second driving frequency, in the multi-frequency mode MFM. According to an embodiment, the first driving frequency may be equal to or higher than the basic frequency. According to an embodiment, the second driving frequency may be lower than the first driving frequency. The display device DD may reduce power consumption by reducing the driving frequency for the second display region DA2.

The size of each of the first display region DA1, the second display region DA3, and the third display region DA3 may be a preset size, and may be changed by an application program.

According to an embodiment, when the still image is displayed on the first display region DA1 and the video is displayed on the second display region DA2, the first display region DA1 may be driven at a driving frequency lower than the basic frequency, and the second display region DA2 may be driven at the driving frequency higher than or equal to the basic frequency.

Figure 3A:
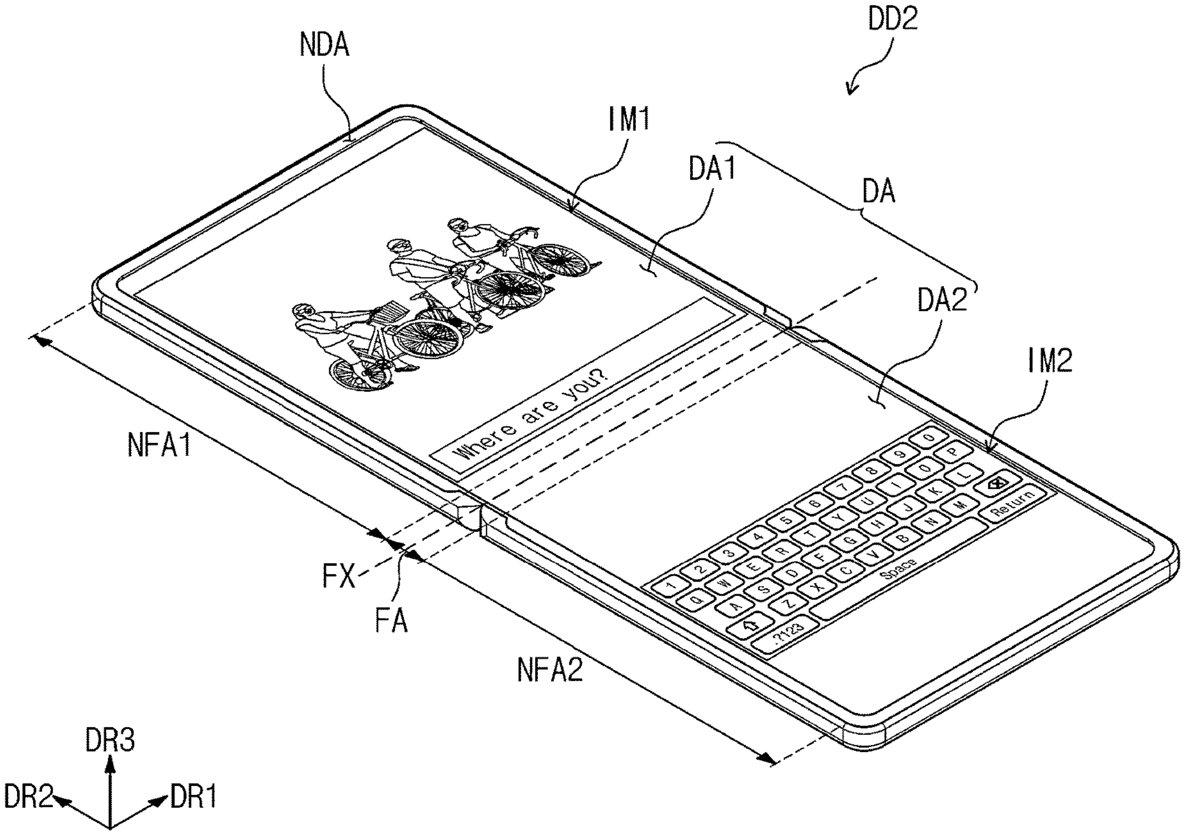
FIGS. 3A and 3B are perspective views illustrating a display device according to an embodiment of the present disclosure.
Figure 3B:
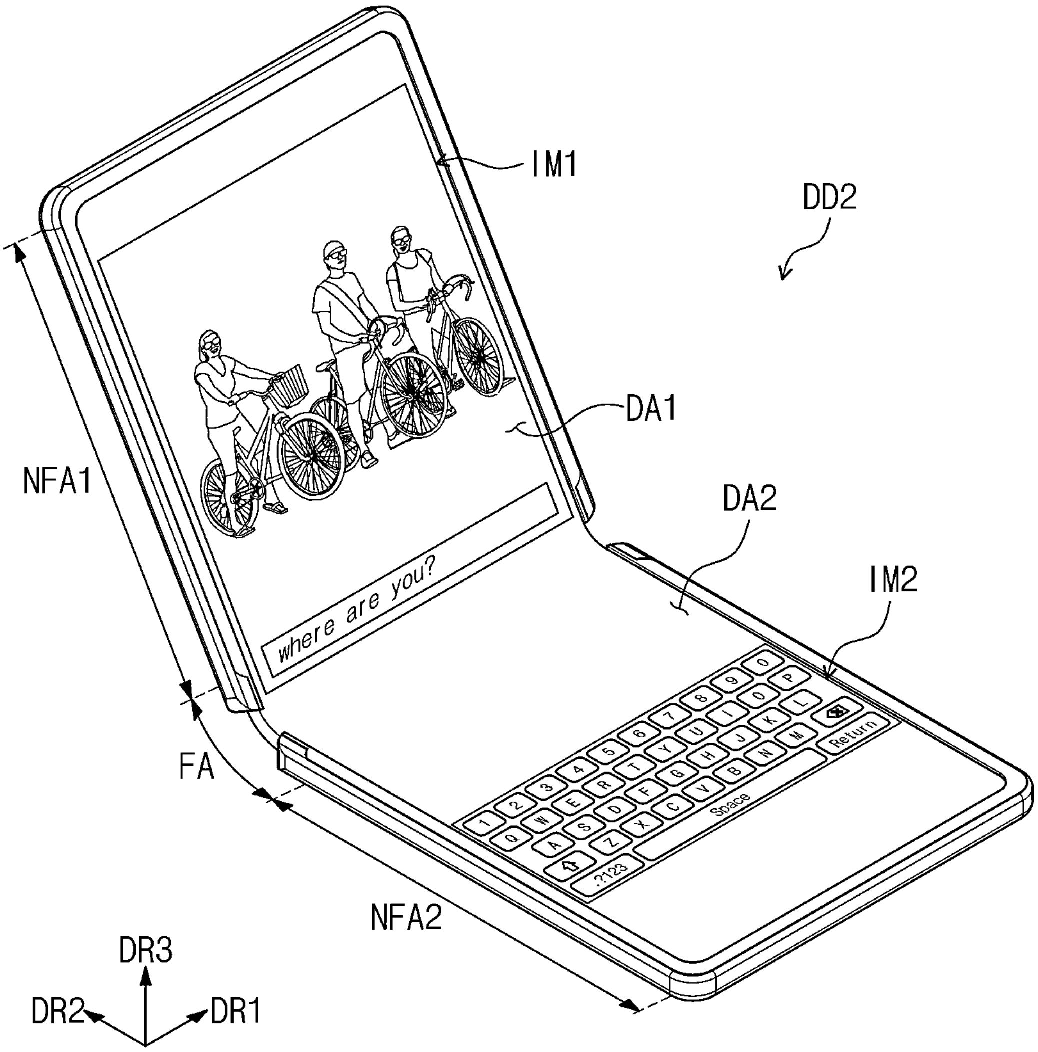

FIGS. 3A and 3B are perspective views illustrating a display device DD2 according to an embodiment of the present disclosure. FIG. 3A illustrates an unfolding state of the display device DD2, and FIG. 3B illustrates a folding state of the display device DD2.

As illustrated in FIGS. 3A and 3B, the display device DD2 includes the display region DA and the non-display region NDA. The display device DD2 may display an image through the display region DA. The display region DA may include a plane defined by the first direction DR1 and the second direction DR2, when the display device DD2 is in the unfolding state. The thickness direction of the display device DD2 may be parallel to a third direction DR3 crossing the first direction DR1 and the second direction DR2. Accordingly, a front surface (or a top surface) and a rear surface (or a bottom surface) of members constituting the display device DD2 may be defined in the third direction DR3. The non-display region NDA may be named as a bezel region. For example, the display region DA may be a rectangular shape. The non-display region NDA surrounds the display region DA.

The display region DA may include a first non-folding region NFA1, a folding region FA, and a second non-folding region NFA2. The folding region FA may be bent about a folding axis FX extending in the first direction DR1.

When the display device DD2 is folded, the first non-folding region NFA1 and the second non-folding region NFA2 may face each other. Accordingly, when the display device DD2 is fully folded, the display region DA may not be exposed to the outside, which may be referred to as an "in-folding" operation. However, this is provided only for the illustrated purpose, and the operation of the display device DD2 is not limited thereto.

According to an embodiment of the present disclosure, when the display device DD2 is folded, the first non-folding region NFA1 and the second non-folding region NFA2 may face each other. Accordingly, when the display device DD2 is folded, the first non-folding region NFA1 may be exposed to the outside, which may be referred to as an "out-folding" operation.

The display device DD2 may perform only any one of the in-folding operation or the out-folding operation. Alternatively, the display device DD2 may perform both the in-folding operation and the out-folding operation. In this case, the same region (for example, the folding region FA) of the display device DD2 may be in-folded and out-folded. Alternatively, a certain region of the display device DD2 may be in-folded, and another region of the display device DD2 may be out-folded.

One folding region and two non-folding regions are illustrated in FIGS. 3A and 3B, but the number of folding regions and the number of non-folding regions are not limited thereto. For example, the display device DD2 may include more than two non-folding regions, and a plurality of folding regions interposed between adjacent non-folding regions.

FIGS. 3A and 3B illustrates that the folding axis FX is parallel to the shorter axis of the display device DD2. However, the present disclosure is not limited thereto. For example, the folding axis FX may extend in a direction parallel to the longer axis of the display device DD2, for example, the first direction DR2.

FIGS. 3A and 3B illustrate that the first non-folding region NFA1, the folding region FA, and the second non-folding region NFA2 may be sequentially arranged in the second direction DR2. However, the present disclosure is not limited thereto. For example, the first non-folding region NFA1, the folding region FA, and the second non-folding region NFA2 may be sequentially arranged in the first direction DR1.

The plurality of display regions DA1 and DA2 may be defined in the display region DA of the display device DD2. Although FIG. 3A illustrates the two display regions DA1 and DA2, the number of display regions DA1 and DA2 is not limited thereto.

The plurality of display regions DA1 and DA2 may include the first display region DA1 and the second display region DA2. For example, the first display region DA1 may be a region for displaying the first image IM1, and the second display region DA2 may be a region for displaying the second image IM2. For example, the first image IM1 may be a video, and the second image IM2 may be a still image.

The display device DD2 according to an embodiment may operate variously depending on an operating mode. The operating mode of the display device DD2 may include a single-frequency mode SFM and a multi-frequency mode MFM. The display device DD2 may drive the first display region DA1 and the second display region DA2 at a basic frequency, in the single-frequency mode SFM. According to an embodiment, the display device DD2 may drive the first display region DA1 for displaying the first image IM1, at the first driving frequency, and drive the second display region DA2 for displaying the second image IM2 at a second driving frequency, in the multi-frequency mode MFM. According to an embodiment, the first driving frequency may be equal to or higher than the basic frequency, and the second driving frequency may be lower than the first driving frequency.

The size of each of the first display region DA1 and the second display region DA2 may be a preset size, and may be changed by an application program. According to an embodiment, the first display region DA1 may correspond to the first non-folding region NFA1, and the second display region DA2 may correspond to the second non-folding region NFA2. In addition, a first portion of the folding region FA may correspond to the first display region DA1, and a second portion of the folding region FA may correspond to the second display region DA2.

According to an embodiment, the entire portion of the folding region FA may correspond to only any one of the first display region DA1 and the second display region DA2.

According to an embodiment, the first display region DA1 may correspond to a first portion the first non-folding region NFA1, and the second display region DA2 may correspond to a second portion of the first non-folding region NFA1, the folding region FA, and the second non-folding region NFA2. In other words, an area of the second display region DA2 may be wider than an area of the first display region DA1.

According to an embodiment, the first display region DA1 may correspond to the first non-folding region NFA1, the folding region FA, and a first portion of the second non-folding region NFA2, and the second display region DA2 may correspond to a second portion of the second non-folding region NFA2. In other words, the area of the first display region DA1 may be wider than an area of the second display region DA2.

As illustrated in FIG. 3B, the first display region DA1 may correspond to the first non-folding region NFA1, and the second display region DA2 may correspond to the folding region FA and the second non-folding region NFA2, when the folding region FA is in the folding state.

Although FIGS. 3A and 3B illustrate the display device DD2 including one folding region, the present disclosure is not limited thereto. For example, the present disclosure may be applied to a display device having two or more folding regions, a rollable display device, or a slidable display device.

FIG. 4A is a view illustrating the operation of a display device in a single-frequency mode. FIG. 4B is a view illustrating the operation of a display device in a multi-frequency mode MFM.

Referring to FIG. 4A, the first image IM1 displayed on the first display region DA1 is a video, and the second image IM2 displayed on the second display region DA2 may be a still image or an image (for example, a keypad image for game handling) having a longer variation cycle. The first image IM1 displayed on the first display region DA1 illustrated in FIG. 4A and the second image IM2 displayed on the second display region DA2 illustrated in FIG. 4A are provided only for the illustrative purpose, and various images may be displayed on the display device DD.

In a single-frequency mode SFM, each of the first display region DA1 and the second display region DA2 of the display device DD may be driven at the basic frequency. For example, the basic frequency may be 120 Hz. In the single-frequency mode SFM, images of a first frame F1 to a 120-th frame F120 may be sequentially displayed on each of the first display region DA1 and the second display region DA2 of the display device DD for one second.

Referring to FIG. 4B, the display device DD may set a driving frequency of the first display region DA1 for displaying the first image IM1, which is a video, to the first driving frequency, in the multi-frequency mode MFM, and may set a driving frequency of the second display region DA2 for displaying the second image IM2 (which is a still image) to the second driving frequency lower than the first driving frequency. The first driving frequency may be 120 Hz, and the second driving frequency may be 1 Hz. The first driving frequency and the second driving frequency may be variously changed.

In the multi-frequency mode MFM, when the first driving frequency is 120 Hz and the second driving frequency is 1 Hz, a data signal corresponding to the first image IM1 may be provided to the first display region DA1 of the display device DD for one second during each of the first frame F1 to the 120-th frame F120. The data signal corresponding to the second image IM2 may be provided to the second display region DA2 only during the first frame F1. In other words, a new data signal is not provided to the second display region DA2 during a second frame F2 to the 120-th frame F120. Accordingly, the second image IM2 which is the same as that of the first frame F1 may be displayed during the second frame F2 to the 120-th frame F120.

Although FIG. 4B illustrates that the first driving frequency is 120 Hz, and the second driving frequency is 1 Hz in the multi-frequency mode MFM, the present disclosure is not limited thereto. The second driving frequency may be variously changed to a frequency (for example, 60 Hz, 30 Hz, and 10 Hz) lower than the first driving frequency.

Figure 5:
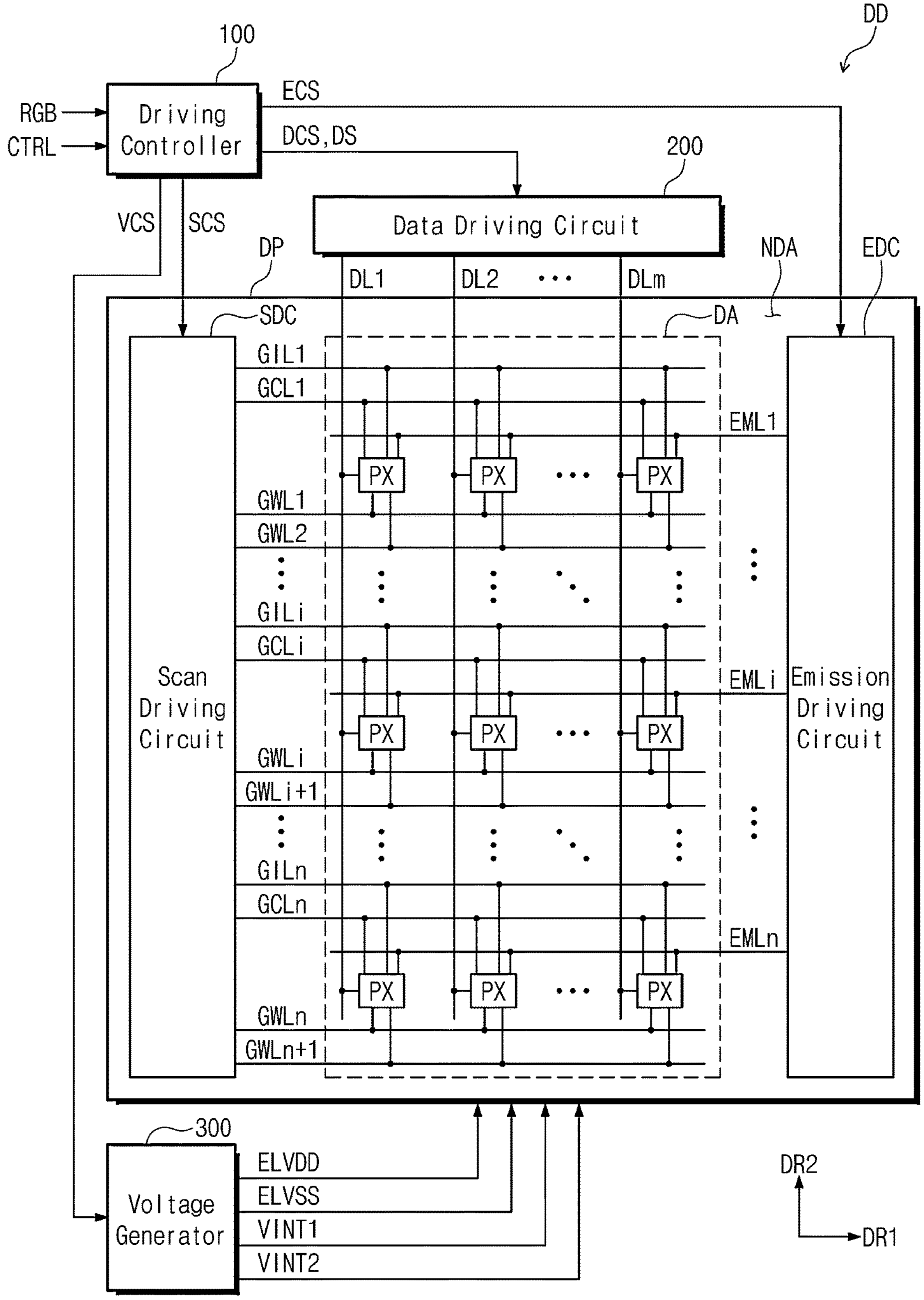
FIG. 5 is a block diagram of a display device according to an embodiment of the present disclosure.

FIG. 5 is a block diagram of a display device according to an embodiment of the present disclosure.

Referring to FIG. 5, the display device DD includes a display panel DP, a driving controller 100, a data driving circuit 200, and a voltage generator 300.

The driving controller 100 receives an image signal RGB and a control signal CTRL. The driving controller 100 converts the image signal RGB into an image data signal DS and outputs a conversion result. The driving controller 100 may output a scan control signal SCS, a data control signal DCS, an emission control signal ECS, and a voltage control signal VCS.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later.

The voltage generator 300 generates voltages for the operation of the display panel DP, in response to the voltage control signal VCS from the driving controller 100. According to an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, the data lines DL1 to DLm and pixels PX. The display panel DP may further include a scan driving circuit SDC and an emission driving circuit EDC. According to an embodiment, the scan driving circuit SDC may be disposed at a first side of the display panel DP. The scan lines GIL1 to GILn, GCL1 to GCLn, and GWL1 to GWLn+1 extend in the first direction DR1 from the scan driving circuit SDC.

The emission driving circuit EDC is disposed at a second side of the display panel DP. The emission control lines EML1 to EMLn extend from the emission driving circuit EDC, in a direction opposite to the first direction DR1.

The scan lines GIL1 to GILn, GCL1 to GCLn, and GWL1 to GWLn+1 and the emission control lines EML1 to EMLn are arranged to be spaced apart from each other in the second direction DR2. The data lines DL1 to DLm extend in a direction opposite to the second direction DR2 from the data driving circuit 200, and may be arranged to be spaced apart from each other in the first direction DR1.

According to an embodiment illustrated in FIG. 5, the scan driving circuit SDC and the emission driving circuit EDC are arranged to face each other while the pixels PX are interposed between the scan driving circuit SDC and the emission driving circuit EDC. However, the present disclosure is not limited thereto. For example, the scan driving circuit SDC and the emission driving circuit EDC may be disposed to be adjacent each other in the non-display region NDA of the display panel DP. According to an embodiment, the scan driving circuit SDC and the emission driving circuit EDC may be integrally implemented into one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as illustrated in FIG. 4, pixels in a first row may be connected to the scan lines GIL1, GCL1, GWL1, and GWL2 and the emission control line EML1. Furthermore, pixels in an i-th row may be connected to the scan lines GILi, GCLi, GWLi, AND GWLi+1 and the emission control line EMLi.

Each of the plurality of pixels PX includes a light emitting element ED (see FIG. 6) and a pixel circuit PXC (see FIG. 6) to control the light emitting element ED to emit light. The pixel circuit PXC may include at least one transistor and at least one capacitor. The scan driving circuit SDC and the emission driving circuit EDC may include transistors formed through the same process as processes for pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100. The scan driving circuit SDC may output scan signals to the scan lines GIL1 to GILn, GCL1 to GCLn, and GWL1 to GWLn+1, in response to the scan control signal SCS.

According to an embodiment, the driving controller 100 may determine the operating mode based on the information included in the control signal CTRL. According to an embodiment, the driving controller 100 may determine the operating mode to be one of the single-frequency mode SFM and the multi-frequency mode MFM based on mode information included in the control signal CTRL. However, the present disclosure is not limited thereto. The driving controller 100 may determine the operating mode, in response to a mode signal provided from the outside (for example, an application processor, a graphic processor, or a host processor). The mode signal provided from the outside may indicate the operating mode of the display device DD among the single-frequency mode SFM and the multi-frequency mode MFM.

The driving controller 100 may determine, depending on the determined operating mode, the driving frequency of each of the first display region DA1 (see FIG. 1) and the second display region DA2 (see FIG. 1) of the display panel DP.

According to an embodiment, when the determined operating mode is the single-frequency mode SFM, the driving controller 100 drives the first display region DA1 and the second display region DA2 at the basic frequency (for example, 120 Hz), as illustrated in FIG. 4A.

When the determined operating mode is the multi-frequency mode MFM, the driving controller 100 may divide the display panel DP into the first display region DA1 and the second display region DA2 and may set the driving frequency for each of the first display region DA1 and the second display region DA2. For example, the driving controller 100 may drive the first display region DA1 at the first driving frequency (for example, 120 Hz), and may drive the second display region DA2 at the second driving frequency (for example, 1 Hz), in the multi-frequency mode MFM.

According to an embodiment of the present disclosure, the driving controller 100 may accumulate stress data based on the image signal RGB, and may output the image data signal DS obtained by compensating for the image signal RGB depending on the accumulated stress data. The operation of the driving controller 100 will be described in detail later.

Figure 6:
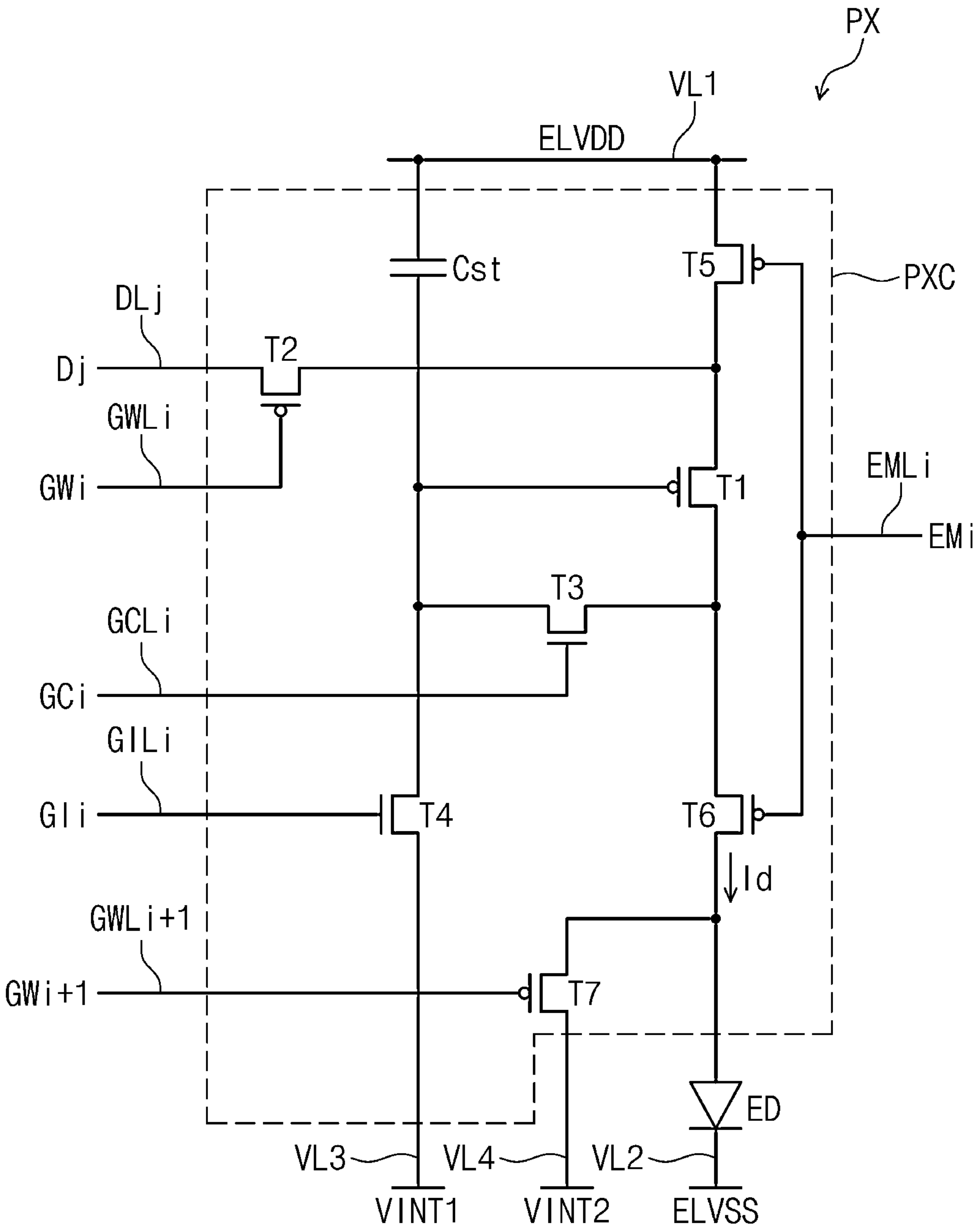
FIG. 6 is a circuit diagram of a pixel according to an embodiment of the present disclosure.

FIG. 6 is a circuit diagram of a pixel, according to an embodiment of the present disclosure.

FIG. 6 illustrates a pixel PX connected to a j-th data line DLj among the data lines DL1 to DLm, i-th scan lines GILi, GCLi, and GWLi and an (i+1)-th scan line GWLi+1 among the scan lines GIL1 to GILn, GCL1 to GCLn, and GWL1 to GWLn+1, and the i-th emission control line EMLi among the emission control lines EML1 to EMLn.

Each of the pixels PX illustrated in FIG. 5 may have the same circuit configuration as the equivalent circuit diagram of the pixel PX illustrated in FIG. 6.

Referring to FIG. 6, the pixel PX of the display device according to an embodiment includes the pixel circuit PXC and at least one light emitting element ED. According to an embodiment, the light emitting element ED may be a light emitting diode. According to an embodiment, one pixel includes one light emitting element ED as an example. The pixel circuit PXC includes first to seventh transistors T1, T2, T3, T4, T5, T6, and T7 and a capacitor Cst.

According to an embodiment, third and fourth transistors T3 and T4 among the first to seventh transistors T1 to T7 are N-type transistors including an oxide semiconductor serving as a semiconductor layer. Each of the first, second, fifth, sixth, and seventh transistors T1, T2, T5, T6, and T7 is a P-type transistor including a low-temperature polycrystalline silicon ("LTPS") semiconductor layer. However, the present disclosure is not limited thereto, and all of the first to seventh transistors T1 to T7 may be P-type transistors or N-type transistors. According to an embodiment, at least one of the first to seventh transistors T1 to T7 may be an N-type transistor, and the remaining transistors may be P-type transistors. In addition, the circuit configuration of a pixel according to an embodiment of the present disclosure is not limited to that illustrated in FIG. 6. The pixel circuit PXC illustrated in FIG. 6 is provided only for the illustrative purpose. For example, the configuration of the pixel circuit PXC may be modified and implemented.

The scan lines GILi, GCLi, GWLi, and GWLi+1 may transmit scan signals GI, GCi, GWi, and GWi+1, respectively, and the emission control line EMLi may transmit an emission control signal EMi. The data line DLj transmits a data signal Dj. The data signal Dj may have a voltage level corresponding to the image signal RGB input into the display device DD (see FIG. 5). First to fourth driving voltage lines VL1, VL2, VL3, and VL4 may transmit the first driving voltage ELVDD, the second driving voltage ELVSS, the first initialization voltage VINT1, and the second initialization voltage VINT2, respectively.

The first transistor T1 includes a first electrode connected to the first driving voltage line VL1 through the fifth transistor T5, a second electrode electrically connected to an anode of the light emitting element ED through the sixth transistor T6, and a gate electrode connected to one terminal of the capacitor Cst. The first transistor T1 may receive the data signal Dj transmitted through the data line DLj depending on a switching operation of the second transistor T2 and may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi transmitted through the scan line GWLi and may transmit the data signal Dj transmitted through the data line DLj to the first electrode of the first transistor T1.

The third transistor T3 includes a first electrode connected to the gate electrode of the first transistor T1, a second electrode connected to the second electrode of the first transistor T1, and a gate electrode connected with the scan line GCLi. The third transistor T3 may be turned on in response to the scan signal GCi transmitted through the scan line GCLi, and connect the gate electrode to the second electrode of the first transistor T1, such that the first transistor T1 is diode-connected.

The second transistor T4 includes a first electrode connected to the gate electrode of the first transistor T1, a second electrode connected to the third driving voltage line VL3 for transmitting the first initialization voltage VINT1 and a gate electrode connected to the initialization scan line GILi. The fourth transistor T4 may be turned on in response to the scan signal GIi received through the scan line GILi to perform an initialization operation for transmitting the first initialization voltage VINT1 to the gate electrode of the first transistor T1 to initialize the voltage of the gate electrode of the first transistor T1.

The fifth transistor T5 may include a first electrode connected to the first voltage line VL1, a second electrode connected to the first electrode of the first transistor T1, and a gate electrode connected to the i-th emission control line EMLi.

The sixth transistor T6 includes a first electrode connected to the second electrode of the first transistor T1, a second electrode connected to the anode of the light emitting element ED, and a gate electrode connected to the emission control line EMLi.

The fifth transistor T5 and the sixth transistor T6 may be simultaneously turned on in response to an emission signal EMi received through the emission control line EMLi. Accordingly, the first driving voltage ELVDD may be compensated through the first transistor T1 which is diode-connected transistor T1 and transmitted to the light emitting element ED.

The seventh transistor T7 includes a first electrode connected with the second electrode of the sixth transistor T6, a second electrode connected to the fourth driving voltage line VL4, and a gate electrode connected to the scan line GWLi+1. The seventh transistor T7 is turned on in response to the scan signal GWi+1 received through the scan line GWLi+1 and bypasses a current applied to the anode of the light emitting element ED to the fourth voltage line VL4.

One terminal of the capacitor Cst is connected to the gate electrode of the first transistor T1, and another terminal of the capacitor Cst is connected to the first driving voltage line VL1, as described above. A cathode of the light emitting element ED may be connected to the second driving voltage line VL2 which transmits the second driving voltage ELVSS. According to an embodiment, the structure of the pixel PX according to an embodiment is not limited to the structure illustrated in FIG. 5. For example, the number of transistors included in one pixel PX, the number of capacitors included in the pixel PX, and the connection relationship between the transistors and the capacitors may be variously modified.

Figure 7A:
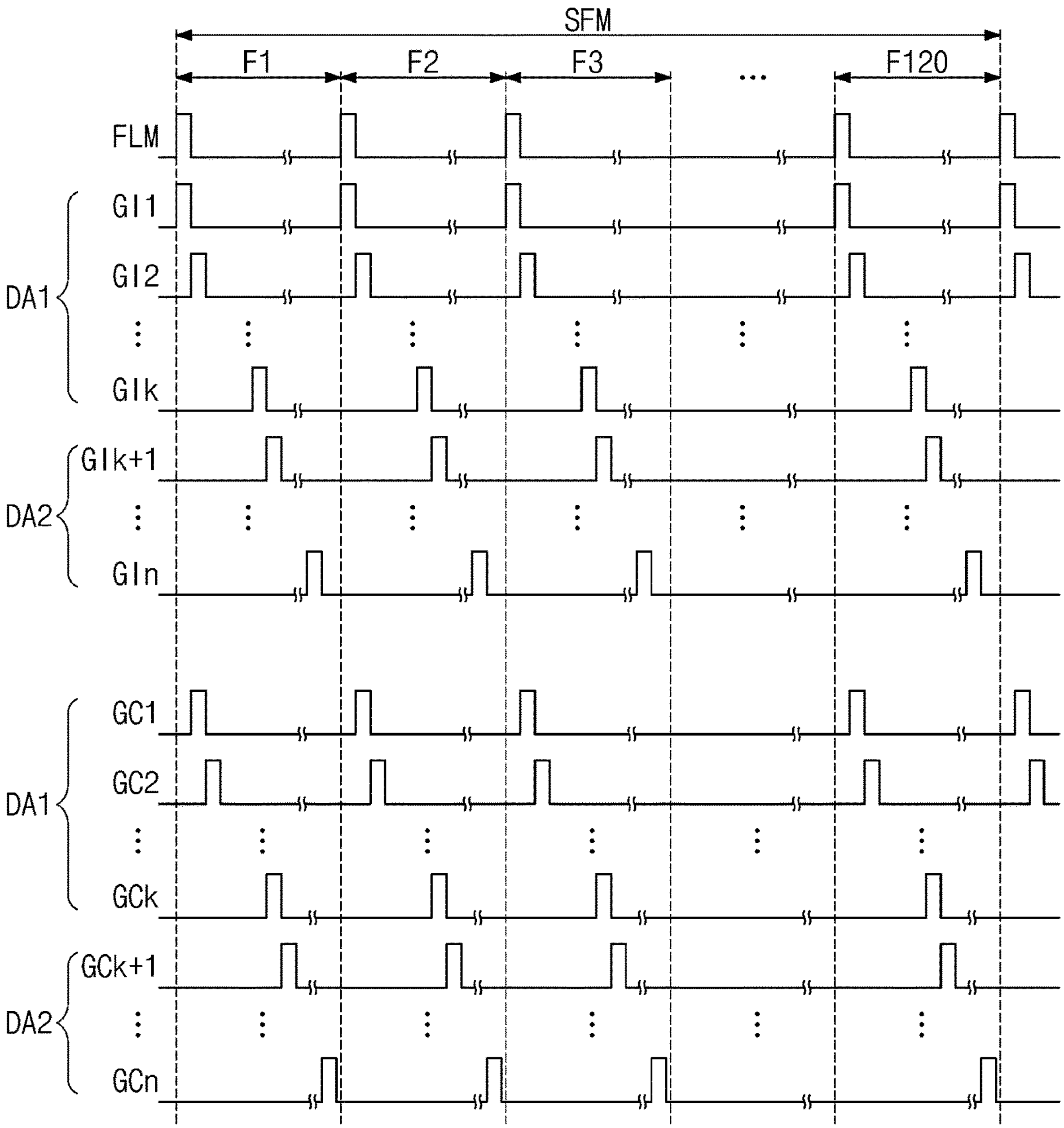
FIG. 7A illustrates scan signals output from a scan driving circuit illustrated in FIG. 5, for a single-frequency mode.

FIG. 7A illustrates the scan signals GL1 to GLn and the scan signals GC1 to GCn output from the scan driving circuit SDC illustrated in FIG. 5, in the single-frequency mode SFM.

Figure 7B:
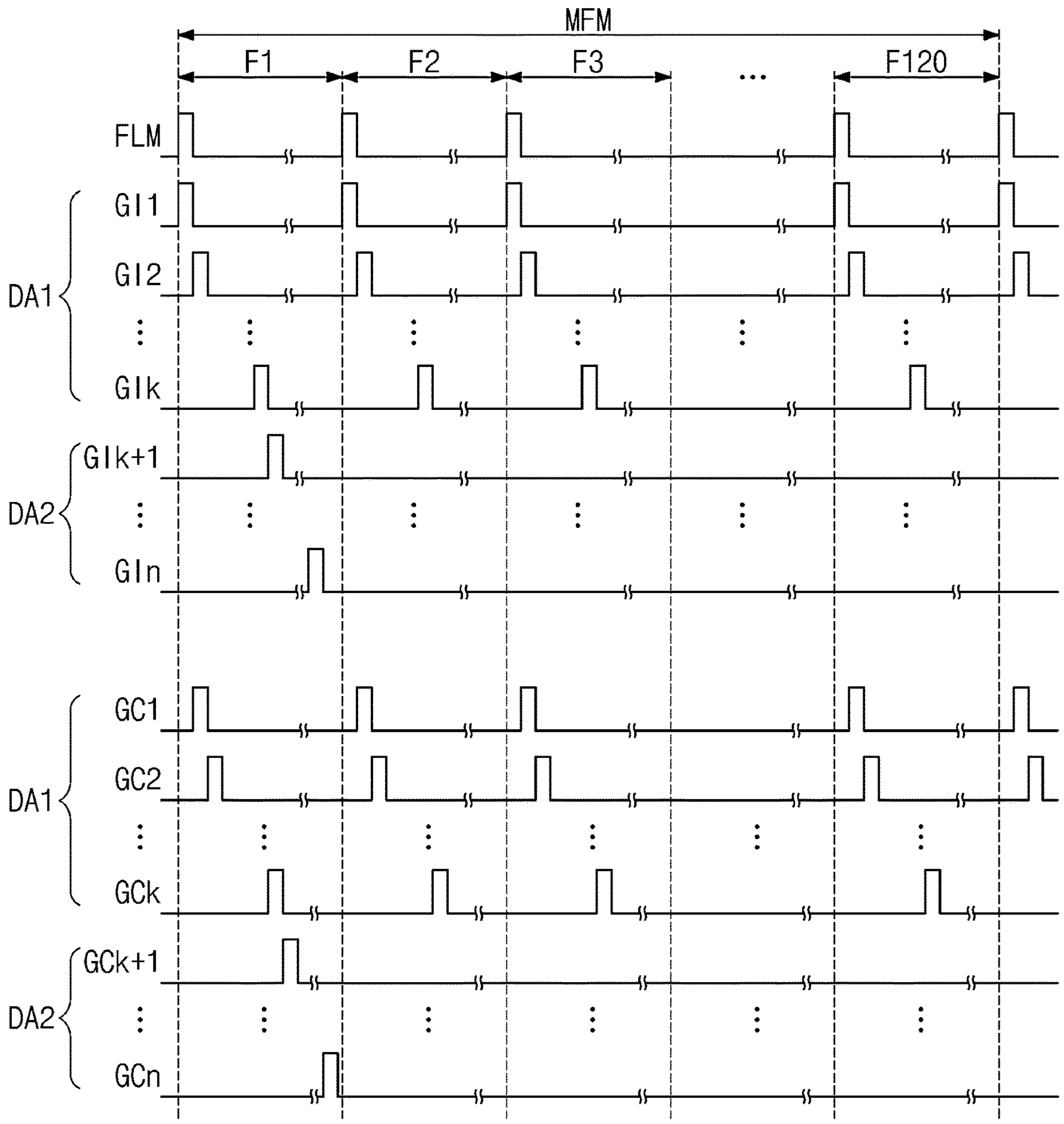
FIG. 7B illustrates scan signals output from a scan driving circuit illustrated in FIG. 5, for a multi-frequency mode.

FIG. 7B illustrates the scan signals GL1 to GLn and the scan signals GC1 to GCn output from the scan driving circuit SDC illustrated in FIG. 5, in the multi-frequency mode MFM.

Referring to FIGS. 7A and 7B, it is assumed that the first display region DA1 illustrated in FIG. 1 may correspond to the scan signals GI1 to GIk, and the scan signals GC1 to GCk, and the second display region DA2 corresponds the scan signals GIk+1 to GIn and the scan signals GCk+1 to GCn. The number of the scan signals corresponding to the first display region DA1 and the second display region DA2 may be variously changed.

First, referring to FIGS. 5 and 7A, the scan control signal SCS may include a start signal FLM. The start signal FLM may be a signal indicating the start of one frame. The start signal FLM may transit to an active level (for example, a high level) in each of the first frame F1, the second frame F2, a third frame F3, . . . , the 120-th frame F120.

The scan driving circuit SDC generates the scan signals GI1 to GIn and the scan signals GC1 to GCn in response to the start signal FLM. When the driving frequency is the first driving frequency (for example, 120 Hz) in the single-frequency mode SFM, the scan driving circuit SDC sequentially activates the scan signals GI1 to GIn to a high level in each of the first frame F1, the second frame F2, the third frame F3, . . . , and the 120-th frame F120, and sequentially activates the scan signals GC1 to GCn to the high level. Although FIG. 7A illustrates the scan signals GI1 to GIn and the scan signals GC1 to GCn, the scan driving circuit SDC may generate scan signals GW1 to GWn+1 (not illustrated) provided to the scan lines GWL1 to GWLn+1 (see FIG. 5). The emission driving circuit EDC may generate emission control signals EM1 to EMn (not illustrated) provided to the emission control lines EML1 to EMLn.

The scan signals GW1 to GWn+1 and the emission control signals EM1 to EMn may also be sequentially activated to a low level in each of the first frame F1, the second frame F2, the third frame F3, . . . , and the 120-th frame F120 in the single-frequency mode SFM.

As described above, the frequency of each of the scan signals GI1 to GIn and the scan signals GC1 to GCn in the single-frequency mode SFM may be a first driving frequency (for example, 120 Hz).

Referring to FIGS. 5 and 7B, when the driving frequency is the second driving frequency (for example, 1 Hz) in the multi-frequency mode MFM, the scan driving circuit SDC sequentially activates the scan signals GI1 to GIn and the scan signals GC1 to GCn to the high level during the first frame F1. The scan driving circuit SDC sequentially activates the scan signals GI1 to GIk to the high level, and holds the scan signals GIk+1 to GIn to the inactive level (for example, the low level) during each of the second frame F2, the third frame F3, . . . , and the 120-th frame F120.

The scan driving circuit SDC sequentially activates the scan signals GC1 to GCk to the high level, and holds the scan signals GCk+1 to GCn to the inactive level (for example, the low level) in each of the second frame F2, the third frame F3, . . . , and the 120-th frame F120.

The first frame F1 in the multi-frequency mode MFM may be referred to as a full driving frame ("FDF") for driving both the first display region DA1 and the second display region DA2. In addition, the second frame F2, the third frame F3, . . . , and the 120-th frame F120 in the multi-frequency mode MFM may be referred to as the masking enable frame driven only in the first display region DA1.

Although not illustrated in FIG. 7B, the scan signals GW1 to GWn+1 may be sequentially activated to the low level in each of the second frame F2, the third frame F3, . . . , and the 120-th frame F120 in the multi-frequency mode MFM. Similarly, the emission control signals EM1 to EMn may be sequentially activated to the low level, in each of the second frame F2, the third frame F3, . . . , and the 120-th frame F120 in the multi-frequency mode MFM.

As described above, the frequency of each of the scan signals GIk+1 to GIn and the scan signals GCk+1 to GCn in the multi-frequency mode MFM may be the second driving frequency (for example, 1 Hz) lower than the first driving frequency (for example, 120 Hz).

As the scan signals GIk+1 to GIn and the scan signals GCk+1 to GCn are held to the inactive level, that is, the low level, in each of the second frame F2, the third frame F3, . . . , and the 120-th frame F120 in the multi-frequency mode MFM, the second display region DA2 of the display panel DP is driven at a frequency lower than the basic frequency. The display device DD may reduce power consumption by reducing the driving frequency for the second display region DA2.

Figure 8:
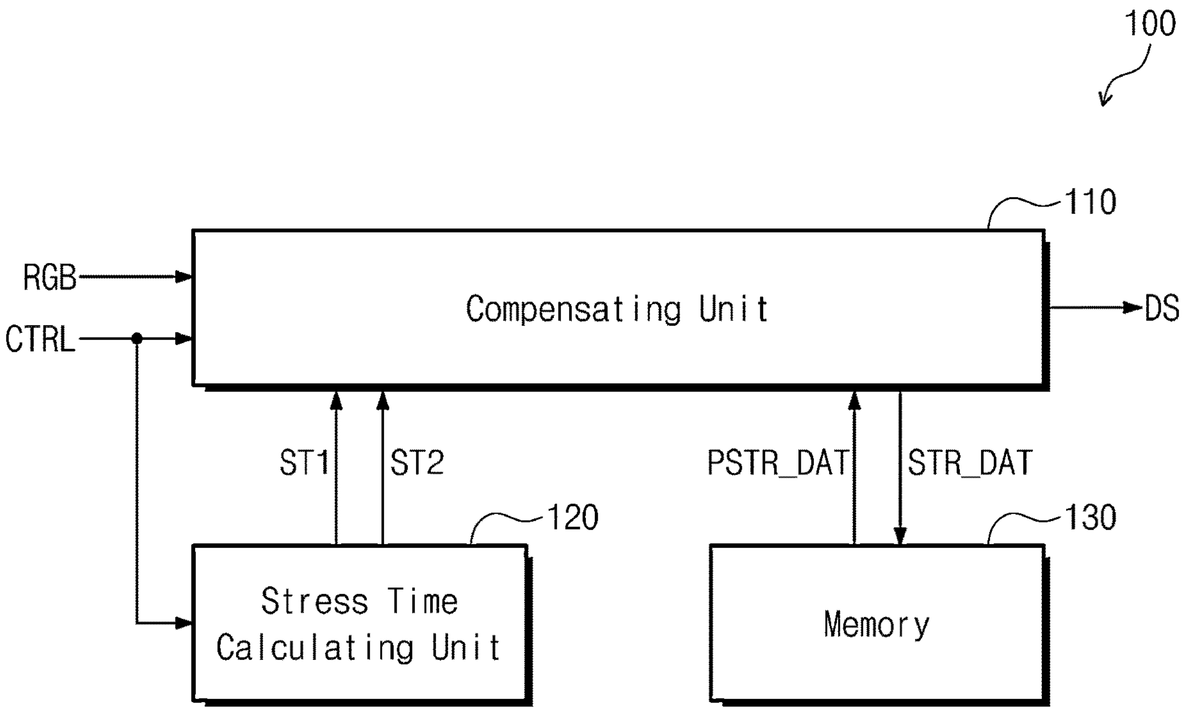
FIG. 8 is a block diagram of a driving controller according to an embodiment of the present disclosure.

FIG. 8 is a block diagram illustrating the driving controller 100 according to an embodiment of the present disclosure.

Referring to FIG. 8, the driving controller 100 includes a compensating unit 110, a stress time calculating unit 120, and a memory 130.

The compensating unit 110 calculates stress data STR_DAT based on the image signal RGB and the control signal CTRL provided from the outside, previous stress data PSTR_DAT provided from the memory 130, and a first stress time ST1 and a second stress time ST2 provided from the stress time calculating unit 120. The compensating unit 110 outputs the image data signal DS corresponding to the image signal RGB based on the stress data STR_DAT, and stores the stress data STR_DAT in the memory 130.

The light emitting element ED in the pixel PX and the first transistor T1 to the seventh transistors T7 in the pixel PX illustrated in FIG. 6 may be deteriorated depending on an operating time. Such deterioration may change the characteristics of the pixel PX. In addition, the deterioration of the pixel PX may be varied depending on the image signal RGB. For example, as the brightness of the image signal RGB is increased, the deterioration rate of the pixel PX may be increased. In addition, the deterioration of the pixel PX may be varied depending on the operating time of the pixel PX.

The compensating unit 110 may store compensation values in advance depending on the image signal RGB, the first stress time ST1, and the second stress time ST2. The compensating unit 110 may store the stress data STR_DAT based on compensation values corresponding to the image signal RGB, the first stress time ST1, and the second stress time ST2.

The memory 130 may store the stress data STR_DAT calculated by the compensating unit 110, and provide the stored stress data STR_DAT serving as the previous stress data PSTR_DAT for a next frame to the compensating unit 110.

The stress time calculating unit 120 may determine an operating mode of the display device DD based on the control signal CTRL. According to an embodiment, the stress time calculating unit 120 may determine the operating mode to one of the single-frequency mode SFM and the multi-frequency mode MFM based on the control signal CTRL.

When the operating mode is the multi-frequency mode MFM and the present frame is a masking enable frame MEF, the stress time calculating unit 120 counts the stress time in each of horizontal lines of the first display region DA1 (refer to FIG. 1). As used herein, the "horizontal line" may be a line of pixels in the same row, and the "stress time" may be the number of times for each horizontal line to be operated per second.

When the operating mode is the multi-frequency mode MFM and the present frame is a full driving frame FDF, the stress time calculating unit 120 counts the stress time in each of horizontal lines of the second display region DA2 (refer to FIG. 1).

The stress time calculating unit 120 may provide the first stress time ST1 and the second stress time ST2, which correspond to each of the horizontal lines of the display panel DP (see FIG. 5) to the compensating unit 110. According to an embodiment, the first stress time ST1 may be a stress time of each of the horizontal lines disposed in the first display region DA1, and the second stress time ST2 may be a stress time of each of the horizontal lines disposed in the second display region DA2.

The compensating unit 110 may receive the image signal (hereinafter, referred to as a "line signal") corresponding to each of the horizontal lines of the display panel DP of the image signal RGB, and calculate the stress data STR_DAT corresponding to each of the horizontal lines of the display panel DP based on the first stress time ST1 and the second stress time ST2

Although the following description will be made that the compensating unit 110 calculates the stress data STR_DAT corresponding to the horizontal lines of the display panel DP, the present disclosure is not limited thereto.

For example, the compensating unit 110 may calculate the stress data STR_DAT for every at least two horizontal lines of the display panel DP. In this case, the stress time calculating unit 120 may calculate the first stress time ST1 corresponding to each of at least two horizontal lines in the first display region DA1 of the display panel DP and the second stress time ST2 corresponding to each of the at least two horizontal lines in the second display region DA2 of the display panel DP.

Figure 9A:
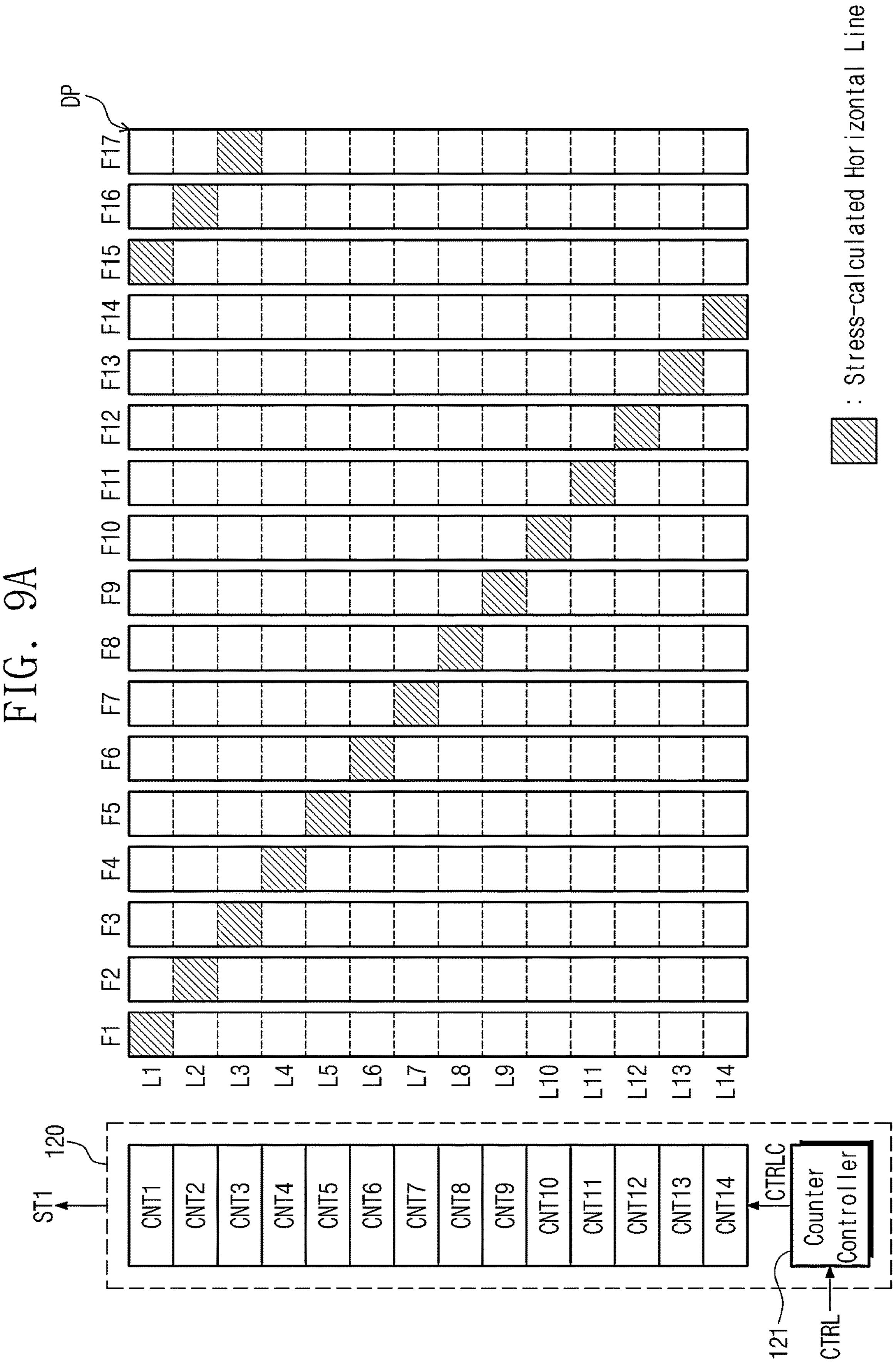
FIG. 9A is a view illustrating the operation of a stress time calculating unit when an operating mode is a single-frequency mode.
Figure 9B:
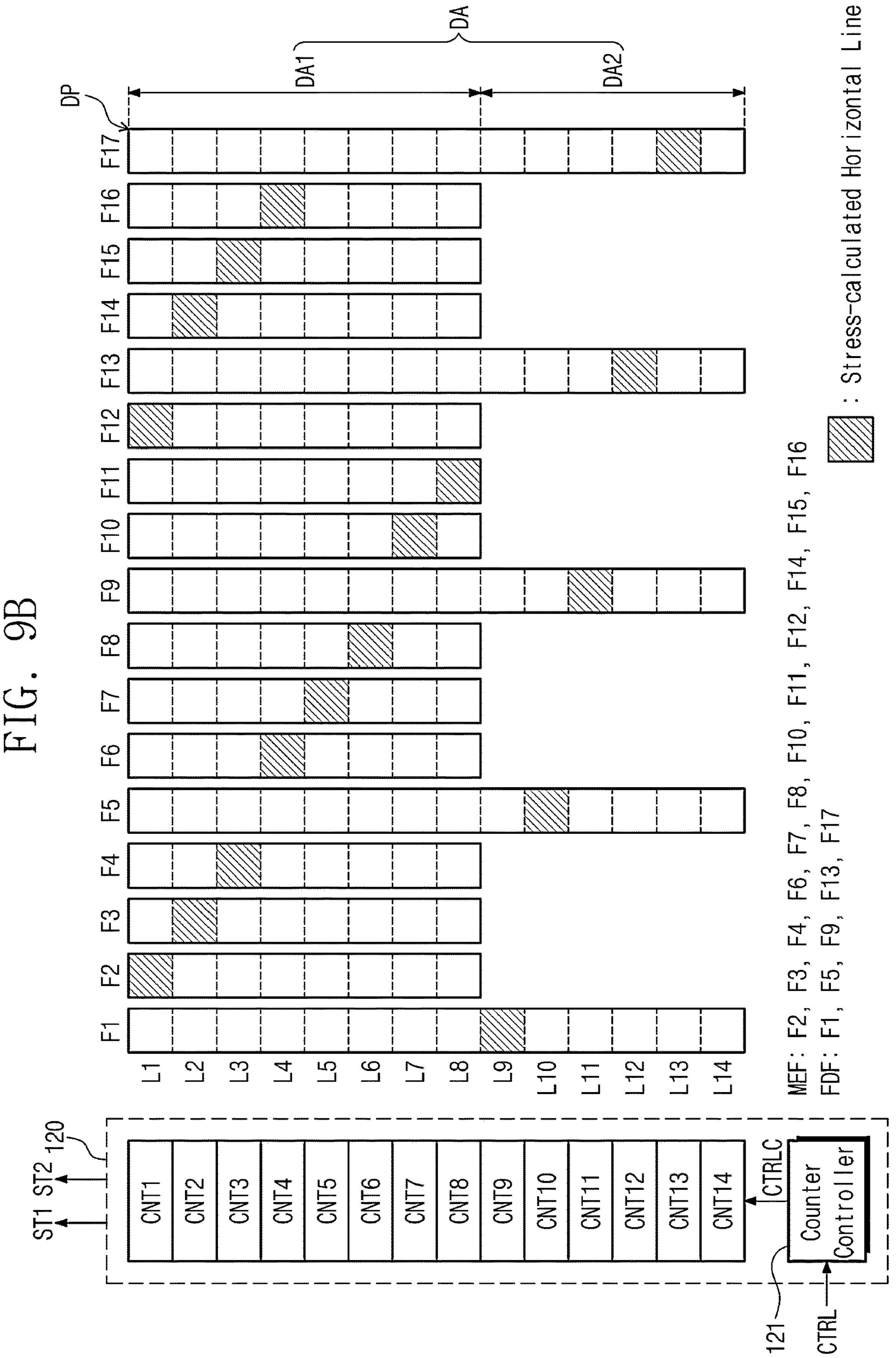
FIG. 9B is a view illustrating the operation of a stress time calculating unit when an operating mode is a multi-frequency mode.

FIG. 9A is a view illustrating the operation of the stress time calculating unit 120, when the operating mode is the single-frequency mode SFM. FIG. 9B is a view illustrating the operation of the stress time calculating unit 120, when the operating mode is the multi-frequency mode MFM.

Figure 10A:
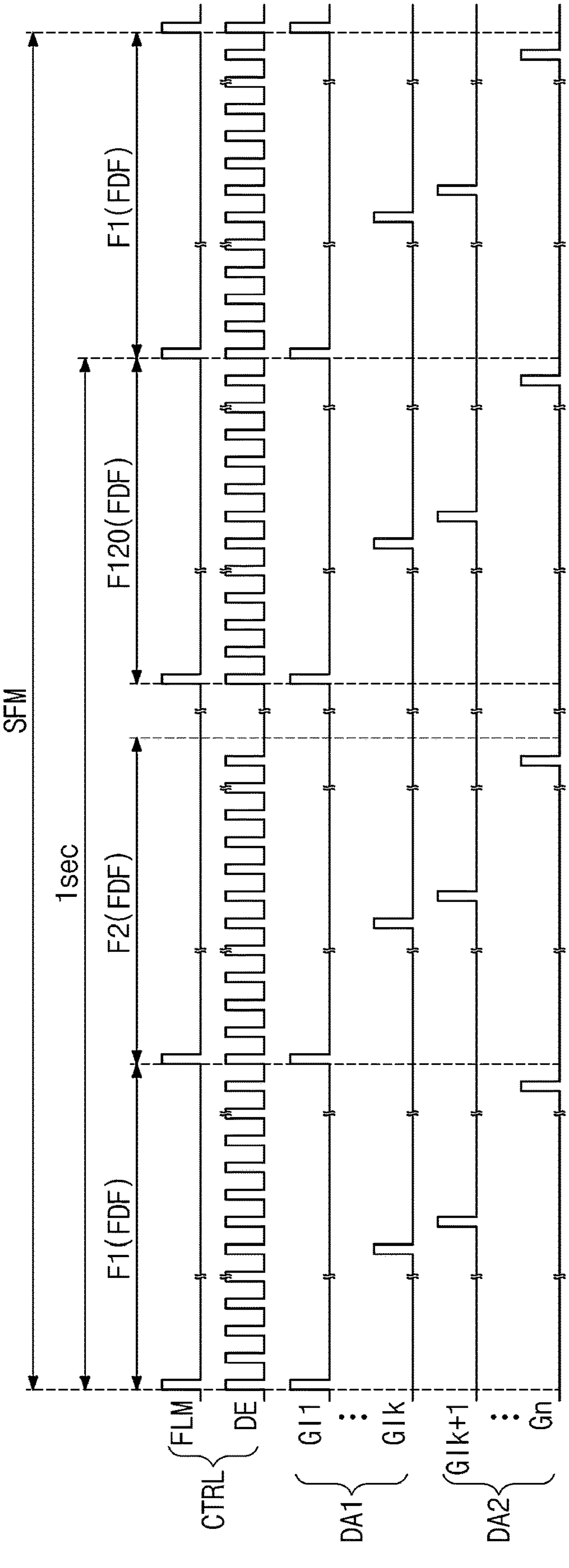
FIG. 10A is a timing diagram illustrating signals used in a display device, when an operating mode is a single-frequency mode.
Figure 10B:
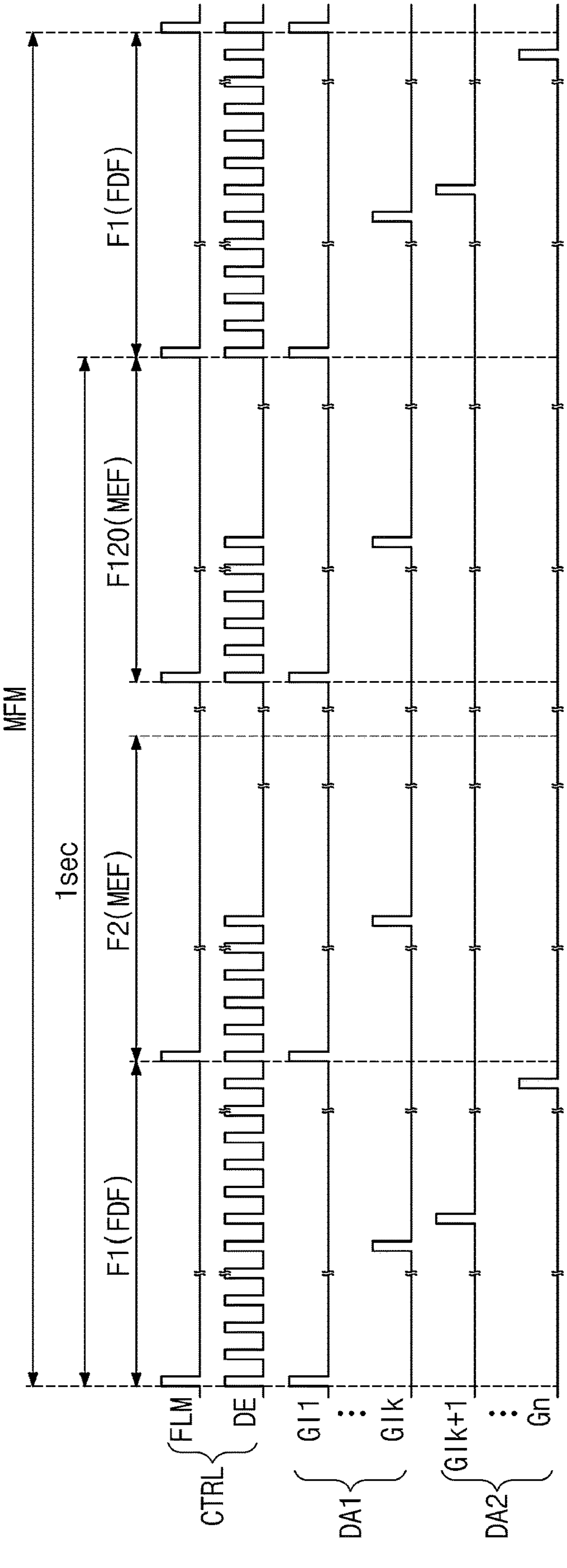
FIG. 10B is a timing diagram illustrating signals used in a display device, when an operating mode is a multi-frequency mode.

FIG. 10A is a timing diagram illustrating signals used in the display device, when the operating mode is the single-frequency mode SFM. FIG. 10B is a timing diagram illustrating signals used in the display device DD, when the operating mode is the multi-frequency mode MFM.

Figure 11:
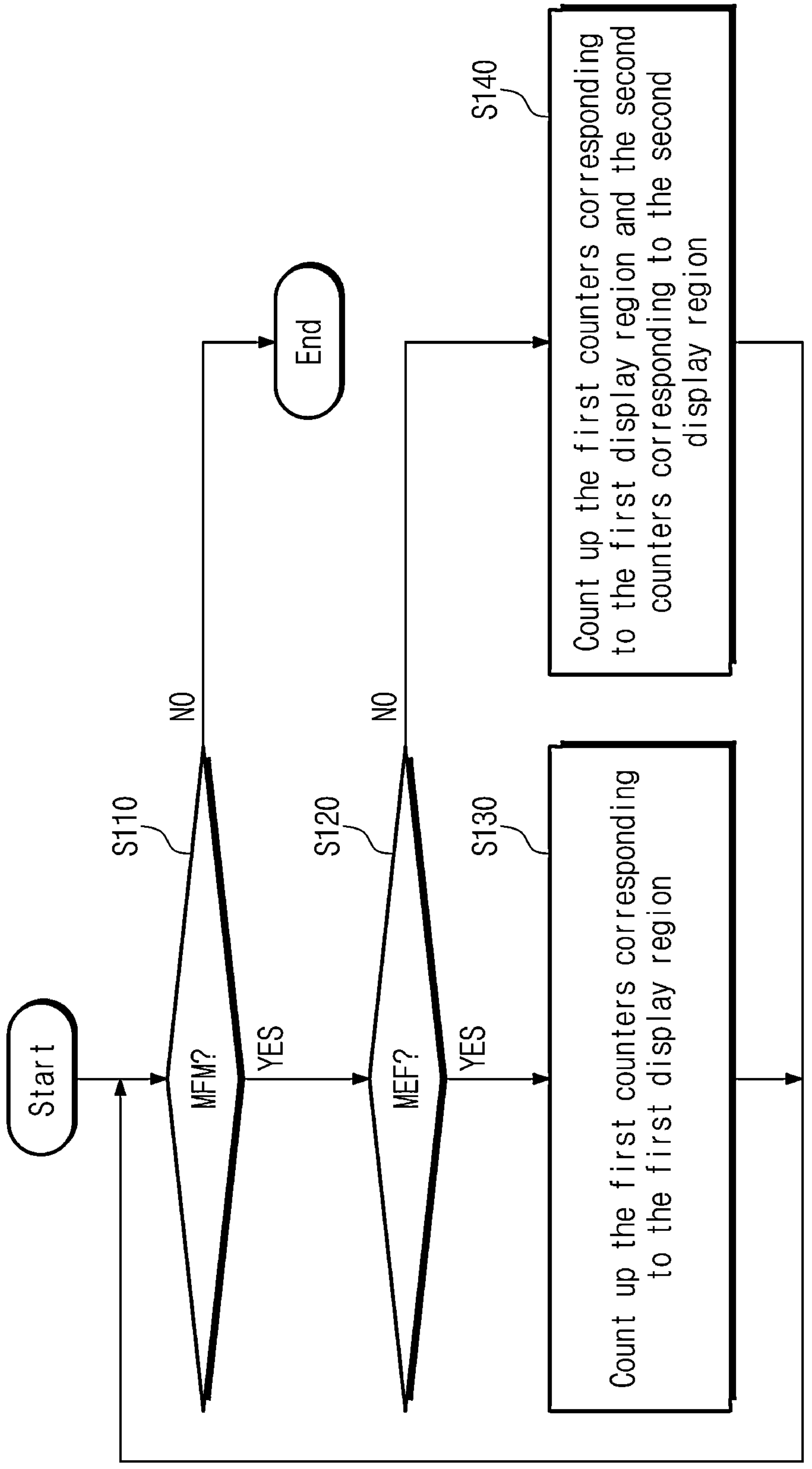
FIG. 11 is a flowchart illustrating the operation of a stress time calculating unit when an operating mode is a multi-frequency mode.

FIG. 11 is a flowchart illustrating the operation of the stress time calculating unit 120, when the operating mode is the multi-frequency mode MFM.

The operation of the driving controller 100 in the display device DD may be divided into a first operation when the operating mode is the single-frequency mode SFM, a second operation when the operating mode is the multi-frequency mode MFM, and when the present frame is the masking enable frame MEF, and a third operation when the operating mode is the multi-frequency mode MFM, and when the present frame is the full driving frame FDF.

When the operating mode is the single-frequency mode SFM (i.e., in the first operation), the operation of the display device DD is as follows.

Referring to FIGS. 5, 8, 9A, and 10A, the stress time calculating unit 120 includes counters CNT1 to CNT14 and a counter controller 121.

The counters CNT1 to CNT14 may include first counters CNT1 to CNT8 and second counters CNT9 to CNT14. The first counters CNT1 to CNT8 and the second counters CNT9 to CNT14 may correspond to horizontal lines L1 to L14 of the display panel DP.

The counter controller 121 of the stress time calculating unit 120 determines an operating mode of the display device DD in response to the control signal CTRL. The stress time calculating unit 120 determines whether the operating mode is the multi-frequency mode MFM (S110). When the operating mode is not the multi-frequency mode MFM, that is, when the operating mode is the single-frequency mode SFM (i.e., in the first operation), the stress time calculating unit 120 may calculate the first stress time ST1 as illustrated in FIG. 9A.

The scan control signal SCS provided from the driving controller 100 to the scan driving circuit SDC may include the start signal FLM. The start signal FLM may be a signal indicating the start of one frame. The start signal FLM may transit to an active level (for example, a high level) in each of the first frame F1, the second frame F2, the third frame F3, . . . , and the 120-th frame F120.

The scan driving circuit SDC may sequentially activate the scan signals GI1 to Gin to the high level in each of the first frame F1, the second frame F2, the third frame F3, . . . , and the 120-th frame F120, in response to the start signal FLM. Each of the first frame F1, the second frame F2, the third frame F3, . . . , and the 120-th frame F120 may be the full driving frame FDF in the single-frequency mode SFM.

The control signal CTRL received by the driving controller 100 may include a data enable signal DE. The data enable signal DE may be a signal transit to the activate level in each horizontal line, when the effective image signal RGB is received. For example, when the pixels PX disposed in the display panel DP are disposed on 14 horizontal lines L1 to L14, the data enable signal DE transit to the activate level fourteen times, in the single-frequency mode SFM. In other words, the data enable signal DE may transit to the active level in the single-frequency mode SFM, whenever each of the horizontal lines L1 to L14 are driven.

According to an embodiment, the counter controller 121 may control each of the counters CNT1 to CNT14 to count up, in response to the start signal FLM in the single-frequency mode SFM, by providing a counter control signal CTRLC to each of the counters CNT1 to CNT14.

For example, when the start signal FLM transit to the active level in the first frame F1, the compensating unit 110 may calculate the stress for the horizontal line L1. In this case, each of the counters CNT1 to CNT14 counts up. In this case, the count value of the counter CNT1 corresponding to the horizontal line L1 is reset after provided as the first stress time ST1 to the compensating unit 110. In other words, when the horizontal line L1 corresponding to the counter CNT1 is driven, the counter CNT1 may be reset.

When the start signal FLM transit to the active level in the second frame F2, each of the counters CNT1 to CNT14 counts up. In this case, the count value of the counter CNT2 corresponding to the horizontal line L2 is reset after provided as the first stress time ST1 to the compensating unit 110

Similarly, when the start signal FLM transit to the active level in the 14-th frame F14, the horizontal line L14 of the display panel DP is driven, and the counters CNT1 to CNT14 count up. In this case, the count value of the counter CNT14 corresponding to the horizontal line L14 is reset after provided as the first stress time ST1 to the compensating unit 110

When the start signal FLM transit to the active level in the 15-th frame F15, each of the counters CNT1 to CNT14 counts up. In this case, the count value, that is, ‘14’ of the counter CNT1 corresponding to the horizontal line L1 is reset after provided as the first stress time ST1 to the compensating unit 110. The compensating unit 110 may calculate the operating time of the horizontal line L1 based on the first stress time ST1 corresponding to the horizontal line L1 and the frequency in the single-frequency mode SFM of the display panel DP.

For example, when the driving frequency of the single-frequency mode SFM is 120 Hz, the operating time of the horizontal line L1 may be calculated through following Equation 1:

$$\text{Operating time} = \text{First stress time } ST1/\text{driving frequency of single-frequency mode } SFM \quad \text{<Equation 1>}$$

As illustrated in FIG. 9A, since the first stress time ST1 is ‘14’ and the driving frequency of the single-frequency mode SFM is 120 Hz, the operating time is 14/120=116.7 milliseconds (ms).

The compensating unit 110 may calculate the stress data STR_DAT for the horizontal line L1 based on the line image signal, which corresponds to the horizontal line L1, of the image signal RGB and the operating time, that is, 116.7 ms.

When the start signal FLM transit to the active level in the 16-th frame F16, each of the counters CNT1 to CNT14 counts up. In this case, the count value, that is, ‘14’, of the counter CNT2 corresponding to the horizontal line L2 is reset after provided as the first stress time ST1 to the compensating unit 110

The compensating unit 110 may calculate the stress data STR_DAT for the horizontal line L2 based on the line image signal, which corresponds to the horizontal line L2, of the image signal RGB and the operating time, that is, 116.7 ms.

When the start signal FLM transit to the active level in the 17-th frame F17, each of the counters CNT1 to CNT14 counts up. In this case, the count value, that is, ‘14’, of the counter CNT3 corresponding to the horizontal line L3 is reset after provided as the first stress time ST1 to the compensating unit 110

The compensating unit 110 may calculate the stress data STR_DAT for the horizontal line L3 based on the line image signal, which corresponds to the horizontal line L3, of the image signal RGB and the operating time, that is, 116.7 ms.

When the operating mode is the multi-frequency mode MFM, and when the present frame is the masking enable frame MEF (i.e., in the second operation), the operation of the driving controller 100 in the display device DD is as follows.

Referring to FIGS. 8, 9B, 10B, and 11, when the operating mode is the multi-frequency mode MFM (S110), the stress time calculating unit 120 determines whether the present frame is the masking enable frame MEF (S120).

The data enable signal DE is a signal transit to the active level in each horizontal line when the effective image signal RGB is received. Accordingly, when the second display region DA2 in the multi-frequency mode MFM is driven, the data enable signal DE may be held to the inactive level (for example, the low level).

The stress time calculating unit 120 may determine a frame including the section at which the data enable signal DE is held to the inactive level, as the masking enable frame MEF. As illustrated in FIG. 9B, each of the first, fifth, ninth, thirteenth, and seventh frames F1, F5, F9, F13, and F17 is the full driving frame FDF, and each of the second, third, fourth, sixth, seventh, eighth, 10-th, 11-th, 12-th, 14-th, 15-th, and 16-th frames F2, F3, F4, F6, F7, F8, F10, F11, F12, F14, F15, and F16 is the masking enable frame MEF.

In an embodiment, as illustrated in FIG. 9B, 14 horizontal lines L1 to L14 of the display panel DP include first horizontal lines L1 to L8 corresponding to the first display region DA1 and second horizontal lines L9 to L14 corresponding to the second display region DA2.

The first counters CNT1 to CNT8 correspond to the first horizontal lines L1 to L8, respectively, and the second counters CNT9 to CNT14 correspond to the second horizontal lines L9 to L14, respectively.

When the present frame is the masking enable frame MEF, the counter controller 121 of the stress time calculating unit 120 controls the first counters CNT1 to CNT8 corresponding to the first display region DA1 to count up by providing a counter control signal CTRLC to each of the first counters CNT1 to CNT8 (S130).

When the present frame is not the masking enable frame MEF, that is, when the present frame is the full driving frame FDF, the counter controller 121 of the stress time calculating unit 120 controls the first counters CNT1 to CNT8 corresponding to the first display region DA1 and the second counters CNT9 to CNT14 corresponding to the second display region DA2 to count up by providing a counter control signal CTRLC to each of the counters CNT1 to CNT14 (S140).

According to an embodiment, when the present frame is the masking enable frame MEF in the multi-frequency mode MFM, the counter controller 121 may control each of the first counters CNT1 to CNT8 corresponding to the first display region DA1 to count up in response to the start signal FLM.

For example, when the start signal FLM transit to the active level in the second frame F2, the compensating unit 110 may calculate the stress for the horizontal line L1. In this case, each of the counters CNT1 to CNT8 counts up. In this case, the count value of the counter CNT1 corresponding to the horizontal line L1 is reset after provided as the first stress time ST1 to the compensating unit 110

When the start signal FLM transit to the active level in the third frame F3, each of the counters CNT1 to CNT8 counts up. In this case, the count value of the counter CNT2 corresponding to the horizontal line L2 is reset after provided as the first stress time ST1 to the compensating unit 110

Similarly, when the start signal FLM transit to the active level in the 11-th frame F11, the horizontal line L8 of the display panel DP is driven and each of the counters CNT1 to CNT8 counts up. In this case, the count value of the counter CNT8 corresponding to the horizontal line L8 is reset after provided as the first stress time ST1 to the compensating unit 110

When the operating mode is the multi-frequency mode MFM, and when the present frame is the full driving frame FDF (i.e., in the third operation), the operation of the driving controller 100 in the display device is as follows.

Referring to FIGS. 8, 9B, 10B, and 11, when the present frame is the full driving frame FDF in the multi-frequency mode MFM, the counter controller 121 may control the counters CNT1 to CNT14 corresponding to the first display region DA1 and the second display region DA2 to count up, in response to the start signal FLM.

For example, when the start signal FLM transit to the active level in the first frame F1, the compensating unit 110 may calculate the stress for the horizontal line L9. In this case, each of the counters CNT1 to CNT14 counts up. In this case, the count value of the counter CNT9 corresponding to the horizontal line L9 is reset after provided as the second stress time ST2 to the compensating unit 110

When the start signal FLM transit to the active level in the fifth frame F5, each of the counters CNT1 to CNT14 counts up. In this case, the count value of the counter CNT10 corresponding to the horizontal line L10 is reset after provided as the second stress time ST2 to the compensating unit 110

When the start signal FLM transit to the active level in the ninth frame F9, the horizontal line L11 of the display panel DP is driven, and each of the counters CNT1 to CNT14 counts up. In this case, the count value of the counter CNT11 corresponding to the horizontal line L11 is reset after provided as the second stress time ST2 to the compensating unit 110.

Similarly, when the stress time calculating unit 120 operates, the stress for the horizontal line L1 of the display panel DP may be calculated in a 25-th frame F25 (not illustrated). In this case, the count value of the counter CNT1 is '6'.

For example, when the second driving frequency of the second display region DA2 is 30 Hz in the multi-frequency mode MEM, the operating time of the horizontal line L1 6/30-200 milliseconds.

As described in S140, when the present frame is the full driving frame FDF, the counters CNT1 to CNT14 corresponding to the first display region DA1 and the second display region DA2 count up.

When the start signal FLM transit to the active level in the 12-th frame F12 which is the masking enable frame, each of the counters CNT1 to CNT8 counts up. In this case, the counter value of the counter CNT1 corresponding to the horizontal line L1 becomes '10'. The counter CNT1 counts up even in the fifth frame F5 and the ninth frame F9 which are full driving frame, as well as the third frame, the fourth frame, the sixth frame, the seventh frame, the eighth frame, the ninth frame, the tenth frame, the eleventh frame, and the twelfth frame F3, F4, F6, F7, F8, F10, F11, and F12.

The compensating unit 110 may calculate the operating time of the horizontal line L1 based on the first stress time ST1 corresponding to the horizontal line L1 and the first driving frequency of the first display region DA1 in the multi-frequency mode MFM of the display panel DP.

For example, when the first driving frequency of the first display region DA1 is 120 Hz in the multi-frequency mode MFM, the operating time of the horizontal line L1 is 10/120=83.3 ms.

The compensating unit 110 may calculate the stress data STR_DAT for the horizontal line L1 based on the line image signal, which corresponds to the horizontal line L1, of the image signal RGB and the operating time, that is, 83.3 ms.

When the start signal FLM transit to the active level in the 14-th frame F14, each of the counters CNT1 to CNT8 counts up. In this case, the count value, that is, '10', of the counter CNT2 corresponding to the horizontal line L2 is reset after provided as the first stress time ST1 to the compensating unit 110

The compensating unit 110 may calculate the stress data STR_DAT for the horizontal line L2 based on the line image signal, which corresponds to the horizontal line L2, of the image signal RGB and the operating time, that is, 83.3 ms.

When the start signal FLM transit to the active level in the 15-th frame F15, each of the counters CNT1 to CNT8 counts up. In this case, the count value, that is, '10', of the counter CNT3 corresponding to the horizontal line L3 is reset after provided as the first stress time ST1 to the compensating unit 110

The compensating unit 110 may calculate the stress data STR_DAT for the horizontal line L3 based on the line image signal, which corresponds to the horizontal line L3, of the image signal RGB and the operating time, that is, 83.3 ms.

As described above, the stress time calculating unit 120 includes the counters CNT1 to CNT14 corresponding to the horizontal lines L1 to L14 of the display panel DP, thereby counting the first stress time ST1 of each of the horizontal lines L1 to L14.

Accordingly, even if the first driving frequency of the first display region DA1 is mutually different from the second driving frequency of the second display region, the compensating unit 110 may exactly calculate the operating time of each of the horizontal lines L1 to L14.

Figure 12:
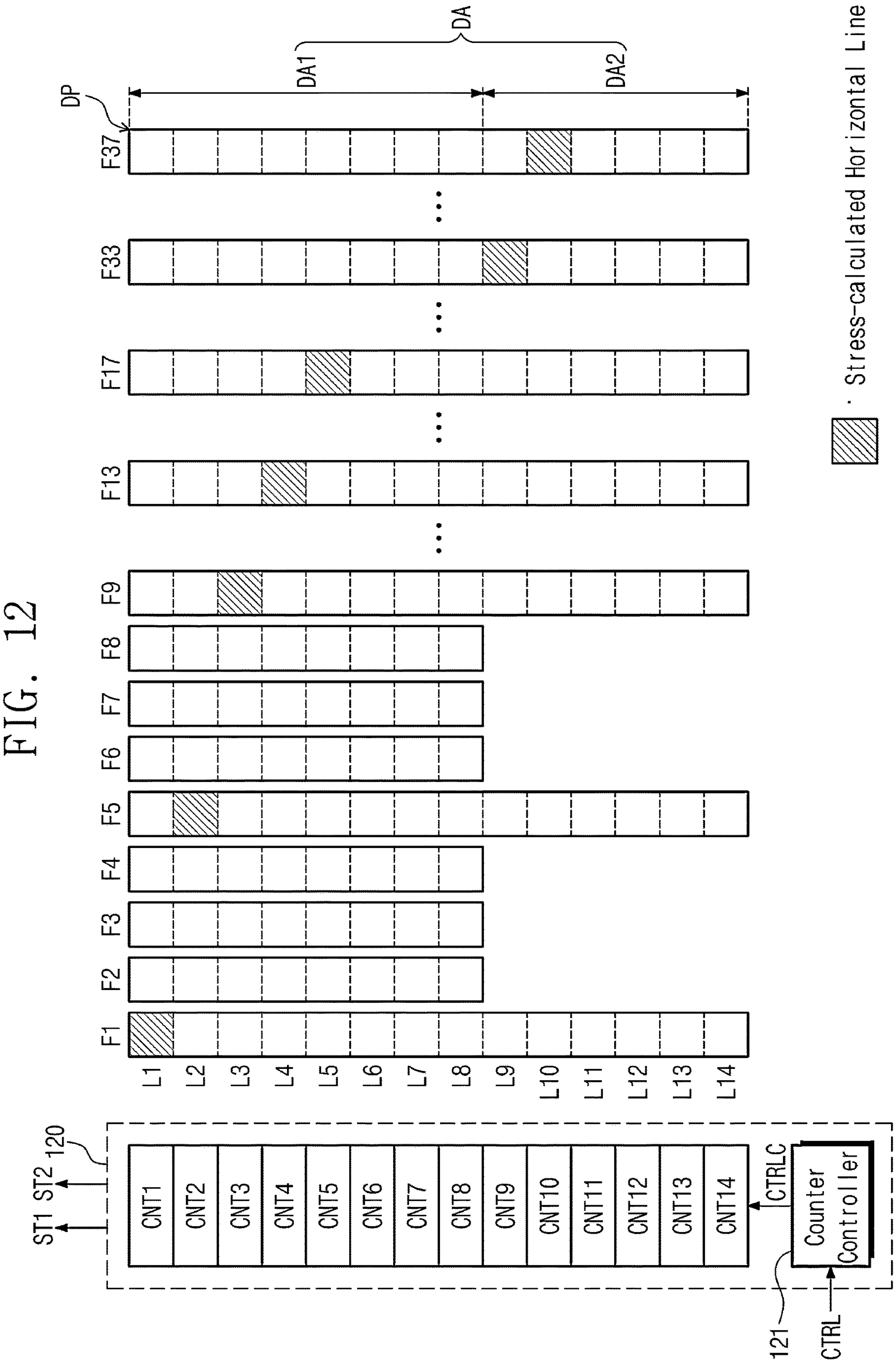
FIG. 12 is a view illustrating the operation of a stress time calculating unit when an operating mode is a multi-frequency mode.

FIG. 12 is a diagram illustrating the operation of a stress time calculating unit when the operating mode is the multi-frequency mode MFM.

Referring to FIGS. 5, 8, and 12, the counter controller 121 of the stress time calculating unit 120 may determine the operating mode of the display device DD based on the control signal CTRL.

When the operating mode is the multi-frequency mode MFM, the counter controller 121 of the stress time calculating unit 120 controls the first counters CNT1 to CNT8 and the second counters CNT9 to CNT14 to count up during the full driving frame FDF. As illustrated in FIG. 12, each of the first, fifth, ninth, 13-th, 17-th, 33-th, and 37-th F1, F5, F9, F13, F17, F33, and F37 is the full driving frame FDF.

When the operating mode is the multi-frequency mode MFM, and when the present frame is the masking enable frame MEF, the first counters CNT1 to CNT8 and the second counters CNT9 to CNT14 of the stress time calculating unit 120 fail to operate. As illustrated in FIG. 12, each of the second, third, fourth, sixth, seventh, and eighth frames F2, F3, F4, F6, F7, and F8 is the masking enable frame MEF.

When the display panel DP includes 14 horizontal lines L1 to L14, and when the count value of each of the first counters CNT1 to CNT8 is '14', the count value may be reset after provided as the first stress time ST1 to the compensating unit 110.

When the count value of each of the second counters CNT9 to CNT14 is '14', the count value may be reset after provided as the first stress time ST1 to the compensating unit 110

For example, when the second driving frequency of the second display region DA2 is 30 Hz in the multi-frequency mode MFM, the operating time of the horizontal line L1 is 14/30=466.7 ms.

The compensating unit 110 may calculate the stress data STR_DAT for the horizontal line L1 based on the line image signal, which corresponds to the horizontal line L1, of the image signal RGB and the operating time, that is, 466.7 ms.

In the same manner, the display device DD may calculate the stress data STR_DAT for each of the 14 horizontal lines L1 to L14 of the display panel DP The display device having the configuration may operate in the multi-frequency mode in which the first display region is driven at the first driving frequency, and the second display region is driven at the second driving frequency lower than the first driving frequency. As the driving frequency of the second display region is reduced, the power consumption of the display device may be reduced.

In addition, the display device calculates the stress data for the first display region in a masking enable frame in the multi-frequency mode, and calculates the stress data for the second display region in the full driving frame. The stress sustain time may be calculated with respect to each of lines using the counter corresponding to the lines of the display panel.

The driving controller of the display device may perform a stress compensating operation based on the stress data and the stress sustain time of each of the lines of the display panel. Accordingly, the change of the characteristic of the pixels may be compensated. Accordingly, the image quality of the display device may be effectively improved.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a first display region and a second display region; and a driving controller configured to receive an image signal and a control signal, output an image data signal to be provided to the display panel, drive the first display region of the display panel at a first driving frequency, and drive the second display region at a second driving frequency lower than the first driving frequency, wherein the display panel includes first horizontal lines corresponding to the first display region and second horizontal lines corresponding to the second display region, and wherein the driving controller is configured to:

count a first stress time of each of the first horizontal lines, and calculate a first operating time of each of the first horizontal lines based on the first stress time and the first driving frequency, count a second stress time of each of the second horizontal lines and calculate a second operating time of each of the second horizontal lines based on the second stress time and the second driving frequency, and output the image data signal obtained by compensating for stress for the image signal based on the image signal, the first operating time, and the second operating time, wherein the second operating time of each of the second horizontal lines has a value of the second stress time divided by the second driving frequency, and the second stress time is a number of the second horizontal lines or a total number of the first horizontal lines and the second horizontal lines.

2. The display device of claim 1, wherein the driving controller is configured to:

output the image data signal obtained by compensating for the stress for the image signal corresponding to the first horizontal lines based on the image signal and the first operating time of each of the first horizontal lines.

3. The display device of claim 1, wherein the driving controller is configured to:

output the image data signal obtained by compensating for the stress for the image signal corresponding to the second horizontal lines based on the image signal and the second operating time of each of the second horizontal lines.

4. The display device of claim 1, wherein the driving controller includes:

a stress time calculating unit configured to count the first stress time of each of the first horizontal lines, and count the second stress time of each of the second horizontal lines;

a memory configured to store previous stress data of a previous frame; and a compensating unit configured to calculate stress data of a present frame based on the image signal, the previous stress data, the first operating time, and the second operating time, and output the image data signal corresponding to the image signal based on the stress data, and wherein the stress data from the compensating unit is stored in the memory, as the previous stress data for a next frame.

5. The display device of claim 4, wherein the stress time calculating unit includes:

first counters corresponding to the first horizontal lines and configured to output the first stress time;

second counters corresponding to the second horizontal lines and configured to output the second stress time; and a counter controller configured to control the first counters and the second counters in response to the control signal.

6. The display device of claim 5, wherein the control signal includes a start signal indicating starting of each of frames, and wherein the stress time calculating unit controls the first counters and the second counters in response to the start signal.

7. The display device of claim 6, wherein the frames include:

a full driving frame for driving the first horizontal lines and the second horizontal lines; and a masking enable frame for driving only the first horizontal lines of the first and second horizontal lines.

8. The display device of claim 7, wherein the counter controller is configured to:

control the first counters to count up during the full driving frame and the masking enable frame, and to control the second counters to count up during the masking enable frame.

9. The display device of claim 8, wherein each of the first counters is reset when a corresponding horizontal line is driven among the first horizontal lines, and wherein each of the second counters is reset when a corresponding horizontal line is driven among the second horizontal lines.

10. A display device comprising:

a display panel including a first display region and a second display region; and a driving controller configured to receive an image signal and a control signal, output an image data signal to be provided to the display panel, drive the first display region of the display panel at a first driving frequency in a multi-frequency mode, and drive the second display region at a second driving frequency lower than the first driving frequency, in the multi-frequency mode, wherein the display panel includes first horizontal lines corresponding to the first display region and second horizontal lines corresponding to the second display region, and wherein the driving controller is configured to: in the multi-frequency mode, count a first stress time of each of the first horizontal lines and calculate a first operating time of each of the first horizontal lines based on the first stress time and the first driving frequency, count a second stress time of each of the second horizontal lines and calculate a second operating time of each of the second horizontal lines based on the second stress time and the second driving frequency, and output the image data signal obtained by compensating for a stress for the image signal based on the image signal, the first operating time, and the second operating time, wherein the second operating time has a value of the second stress time divided by the second driving frequency, the second stress time is a number of the second horizontal lines in the multi-frequency mode and the second stress time is a total number of the first horizontal lines and the second horizontal lines in a single-frequency mode.

11. The display device of claim 10, wherein the driving controller is configured to: in the multi-frequency mode, compensate for the stress for the image signal corresponding to the first horizontal lines based on the image signal and the first operating time of each of the first horizontal lines, and output the image data signal obtained by compensating for the stress for the image signal corresponding to the second horizontal lines based on the image signal and the second operating time of each of the second horizontal lines.

12. The display device of claim 10, wherein the driving controller is configured to: in the single-frequency mode, count a third stress time of each of the first horizontal lines and the second horizontal lines and calculate a third operating time of each of the first horizontal lines and the second horizontal lines based on the third stress time and the first driving frequency, and output the image data signal obtained by compensating for the stress for the image signal based on the image signal and the third operating time.

13. The display device of claim 10, wherein the driving controller includes:

a stress time calculating unit configured to count the first stress time of each of the first horizontal lines, and count the second stress time of each of the second horizontal lines;

a memory configured to store previous stress data of a previous frame; and a compensating unit configured to calculate stress data of a present frame based on the image signal, the previous stress data, the first operating time, and the second operating time, and output the image data signal corresponding to the image signal based on the stress data, and wherein the stress data from the compensating unit is stored in the memory, as the previous stress data for a next frame.

14. The display device of claim 13, wherein the stress time calculating unit includes:

first counters corresponding to the first horizontal lines and configured to output the first stress time;

second counters corresponding to the second horizontal lines and configured to output the second stress time; and a counter controller configured to control the first counters and the second counters, in response to the control signal.

15. The display device of claim 14, wherein the control signal includes a start signal indicating starting of each of frames, and wherein the stress time calculating unit controls the first counters and the second counters in response to the start signal.

16. The display device of claim 15, wherein the frames include a full driving frame for driving the first horizontal lines and the second horizontal lines, and a masking enable frame for driving only the first horizontal lines of the first and second horizontal lines, and wherein the counter controller is configured to:

control the first counters to count up during the full driving frame and the masking enable frame, and to control the second counters to count up during the masking enable frame.

17. An electronic device comprising:

a display panel including a first display region and a second display region; and a driving controller configured to receive an image signal and a control signal, output an image data signal to be provided to the display panel, drive the first display region of the display panel at a first driving frequency, and drive the second display region at a second driving frequency lower than the first driving frequency, wherein the display panel includes first horizontal lines corresponding to the first display region and second horizontal lines corresponding to the second display region, wherein the driving controller includes:

a stress time calculating unit configured to count a first stress time of each of the first horizontal lines, and count a second stress time of each of the second horizontal lines;

a memory configured to store previous stress data of a previous frame; and a compensating unit configured to calculate stress data of a present frame based on the image signal, the previous stress data, a first operating time, and a second operating time, and output the image data signal corresponding to the image signal based on the stress data, and wherein the stress data from the compensating unit is stored in the memory, as the previous stress data for a next frame, wherein the second operating time of each of the second horizontal lines has a value of the second stress time divided by the second driving frequency, and the second stress time is a number of the second horizontal lines or a total number of the first horizontal lines and the second horizontal lines.

18. The electronic device of claim 17, wherein the stress time calculating unit includes:

first counters corresponding to the first horizontal lines and configured to output the first stress time;

second counters corresponding to the second horizontal lines and configured to output the second stress time; and a counter controller configured to control the first counters and the second counters, in response to the control signal.

19. The electronic device of claim 18, wherein the control signal includes a start signal indicating starting of each of frames, and wherein the stress time calculating unit controls the first counters and the second counters, in response to the start signal.

20. The electronic device of claim 19, wherein the frames include a full driving frame for driving the first horizontal lines and the second horizontal lines, and a masking enable frame for driving only the first horizontal lines of the first and second horizontal lines, and wherein the counter controller is configured to:

control the first counters to count up during the full driving frame and the masking enable frame, and to control the second counters to count up during the masking enable frame.

* * * * *